United States Patent [19]

Hamoda et al.

[11] Patent Number: 5,469,308
[45] Date of Patent: Nov. 21, 1995

[54] MANAGEMENT APPARATUS FOR A PLURALITY OF CASSETTES

[75] Inventors: Keiji Hamoda, Fukaya; Ritsuo Yoshida, Kumagaya; Toshihiko Iijima; Chiemi Yamamoto, both of Fukaya; Akihiko Kubo, Kumagaya, all of Japan

[73] Assignee: Kabushiki Kaisha Toshiba, Kawasaki, Japan

[21] Appl. No.: 290,514

[22] Filed: Aug. 15, 1994

Related U.S. Application Data

[63] Continuation of Ser. No. 842,447, Feb. 27, 1992, abandoned.

[30] Foreign Application Priority Data

| Feb. 28, 1991 | [JP] | Japan | 3-034559 |
| Mar. 11, 1991 | [JP] | Japan | 3-045074 |
| Apr. 15, 1991 | [JP] | Japan | 3-111010 |
| Apr. 15, 1991 | [JP] | Japan | 3-111043 |

[51] Int. Cl.⁶ ............................ G11B 15/68
[52] U.S. Cl. ............................ 360/71; 360/69
[58] Field of Search ............................ 360/69, 71, 137

[56] References Cited

U.S. PATENT DOCUMENTS

| 4,644,425 | 2/1987 | Tamaki | 360/69 |
| 4,654,727 | 3/1987 | Blum et al. | 360/71 |
| 4,991,040 | 2/1991 | Fukuda et al. | 360/137 X |

FOREIGN PATENT DOCUMENTS

| 0162248 | 11/1985 | European Pat. Off. |
| 310256 | 4/1989 | European Pat. Off. |
| 2401573 | 3/1979 | France |
| 2517863 | 6/1983 | France |
| 2570538 | 3/1986 | France |
| 3923761 | 7/1989 | Germany |
| 3911860 | 2/1990 | Germany |

OTHER PUBLICATIONS

Patent Abstracts of Japan, vol. 6, No. 137 (P-130) Jul. 1982 re JP-A-57 060 563.
Patent Abstracts of Japan, vol. 8, No. 183 (P-296) Aug. 1984 re JP-A-59 075 440.
Patent Abstracts of Japan, vol. 13, No. 566 (P-976) Dec. 1989 re JP-A-01 236 447.
Patent Abstracts of Japan, vol. 17, No. 596 (P-1636) Oct. 1993 re JP-A-05 174 447.
Patent Abstracts of Japan, vol. 10, No. 241 (P-488) Aug. 1986 re JP-A-61 071 440.
Patent Abstracts of Japan, vol. 13, No. 322 (P-902) Jul. 1989 re JP-A-01 089 058.
P. Livingston et al, "The M.A.R.C. II System: A Modular Multiple Robotic Record/Play Videocassette System", SMPTE Journal, vol. 99, No. 6, Jun. 1990, pp. 448–452.

*Primary Examiner*—Aristotelis Psitos
*Assistant Examiner*—James L. Habermehl
*Attorney, Agent, or Firm*—Cushman Darby & Cushman

[57] ABSTRACT

A cassette convey means can carry a plurality of cassettes, and can selectively convey and mount a cassette to a cassette driving section, or can externally feed the mounted cassette. A cassette selection/setting means outputs designation data for selecting and designating one of the cassettes. An operation mode input means outputs an operation signal including cassette subsidiary information such as a timer setting instruction or remaining amount display data for the cassette designated by the cassette selection setting means, or a tape driving instruction. A cassette information storage means stores information of each of the plurality of cassettes. A system controller checks conditions of pieces of input information from the above-mentioned means, selects an optimal cassette according to a purpose, and controls the cassette convey means to mount the selected cassette on the tape driving section. A cassette exchange mode selection means can switch an exchange mode between a mode of performing automatic cassette selection, and a mode of performing cassette selection upon an operation by a user in a cassette exchange mode.

1 Claim, 20 Drawing Sheets

| MOUNT POSITION | PRESENCE/ ABSENCE OF CASSETTE | RECORDING POSSIBLE/ IMPOSSIBLE | |
|---|---|---|---|
| A | | | |
| B | | | |
| C | | | |
| D | | | |

CASSETTE INFORMATION

FIG. 2A

| DESIGNATED CASSETTE | OPERATION CONTENT | START | END |
|---|---|---|---|
| A | | | |
| B | | | |
| A | | | |
| A | | | |
| | | | |
| | | | |

TIMER INFORMATION

FIG. 2B

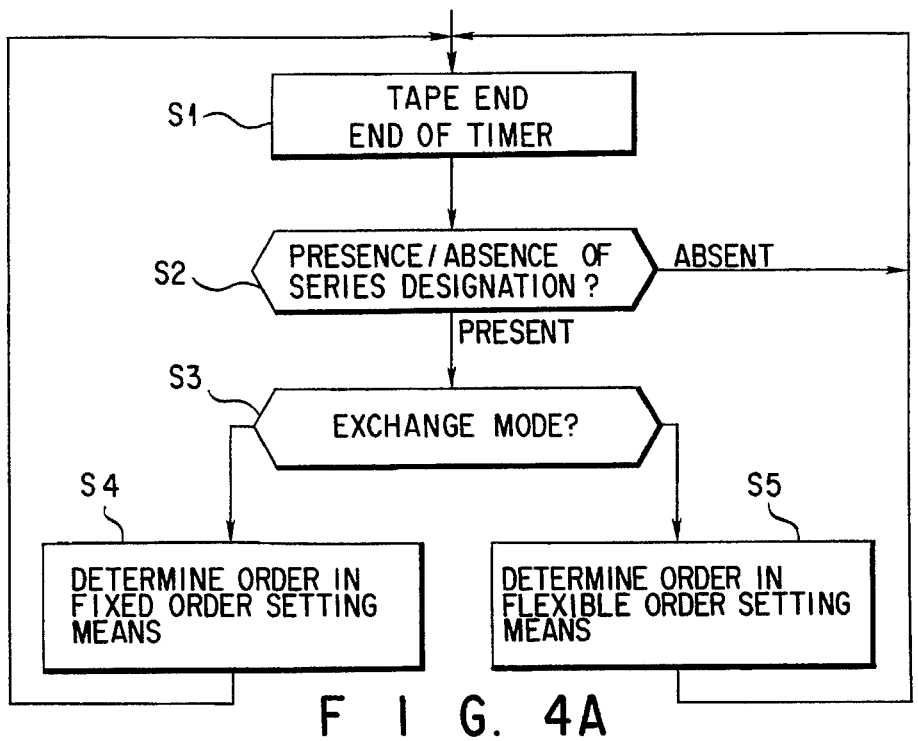
F I G. 4A
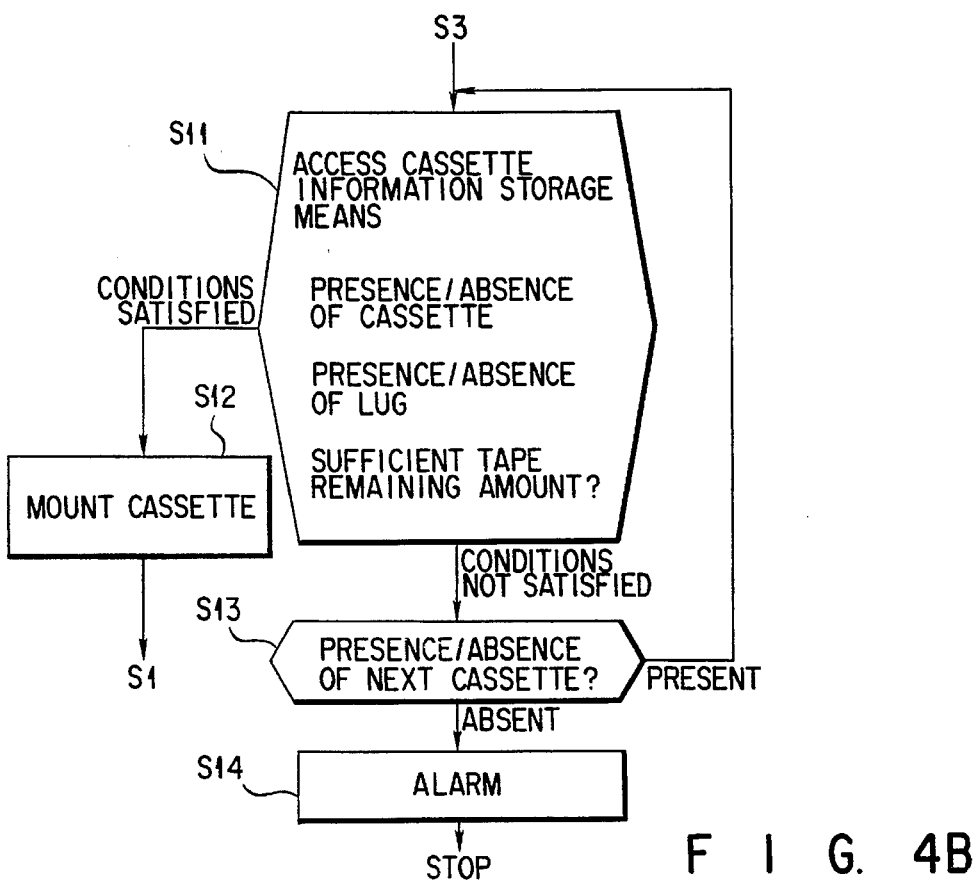
F I G. 4B

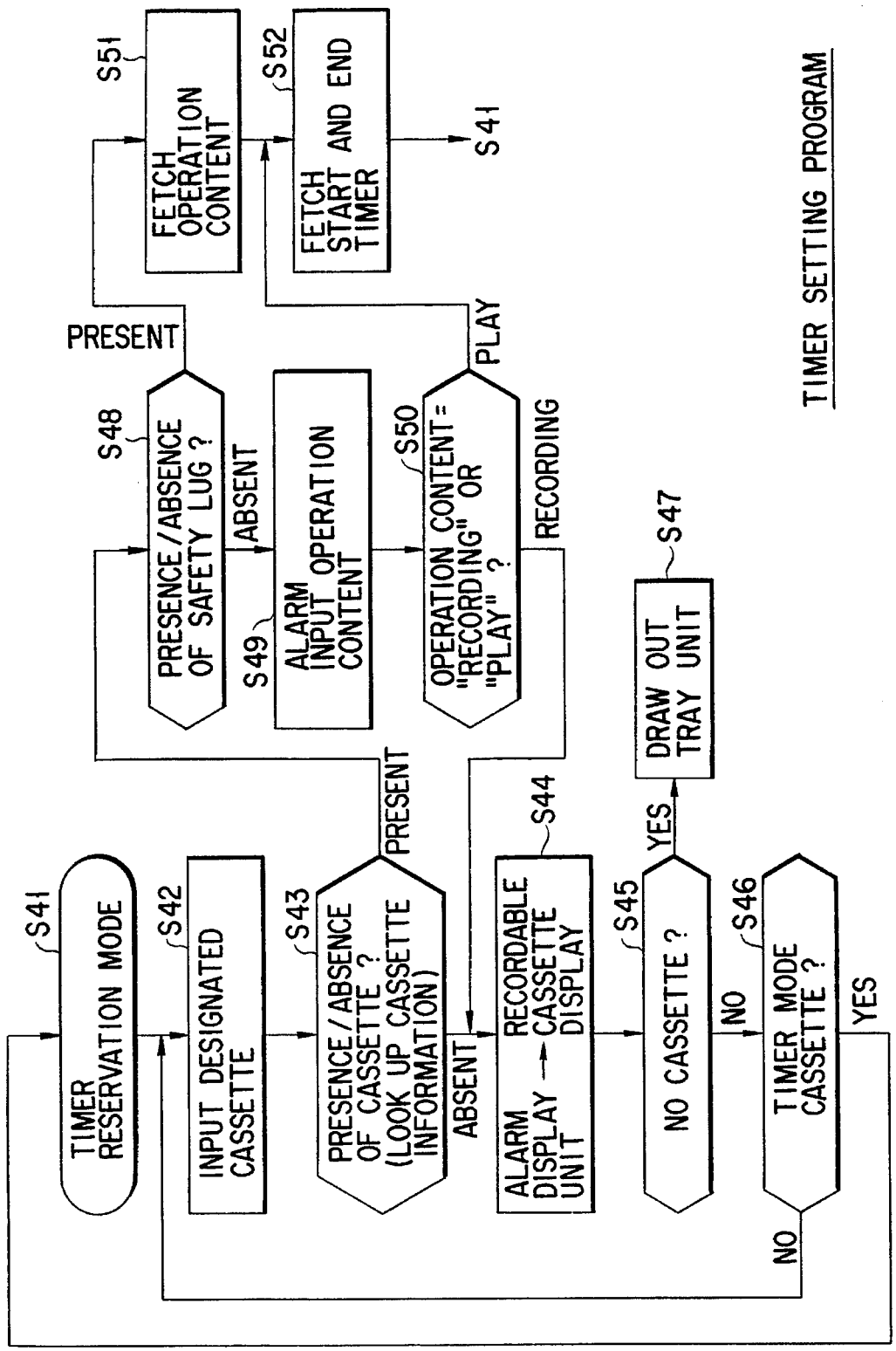
FIG. 6   TIMER SETTING PROGRAM

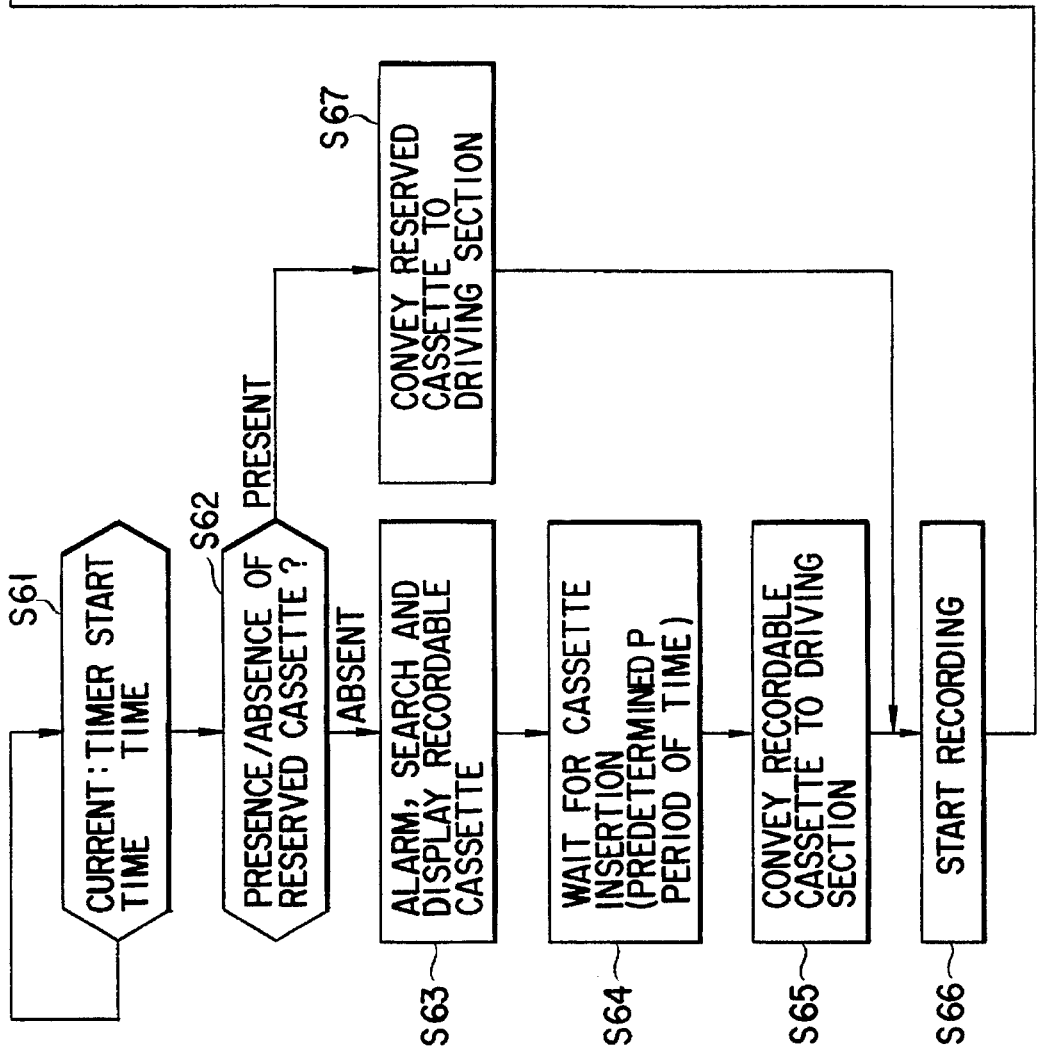
FIG. 7 TIMER EXECUTION RECORDING PROGRAM

TIMER EXECUTION PLAY PROGRAM

FIG. 10

| MOUNT POSITION | PRESENCE/ ABSENCE OF CASSETTE | RECORDING POSSIBLE/ IMPOSSIBLE | REMAINING AMOUNT | TRACKING ADJUSTMENT DATA |
|---|---|---|---|---|
| A | PRESENT | POSSIBLE | W 4 | x 1 |
| B | PRESENT | POSSIBLE | W 2 | x 2 |
| C | PRESENT | POSSIBLE | W 3 | x 1 |
| D | ABSENT | IMPOSSIBLE | | |

FIG. 12

| MOUNT POSITION | PRESENCE/ ABSENCE OF CASSETTE | RECORDING POSSIBLE/ IMPOSSIBLE | REMAINING AMOUNT | VIRGIN | SELECTION SETTING |
|---|---|---|---|---|---|
| A | PRESENT | POSSIBLE | 1 2 3 | NO | |
| B | PRESENT | POSSIBLE | | YES | |
| C | PRESENT | POSSIBLE | | | |
| D | ABSENT | IMPOSSIBLE | | | |

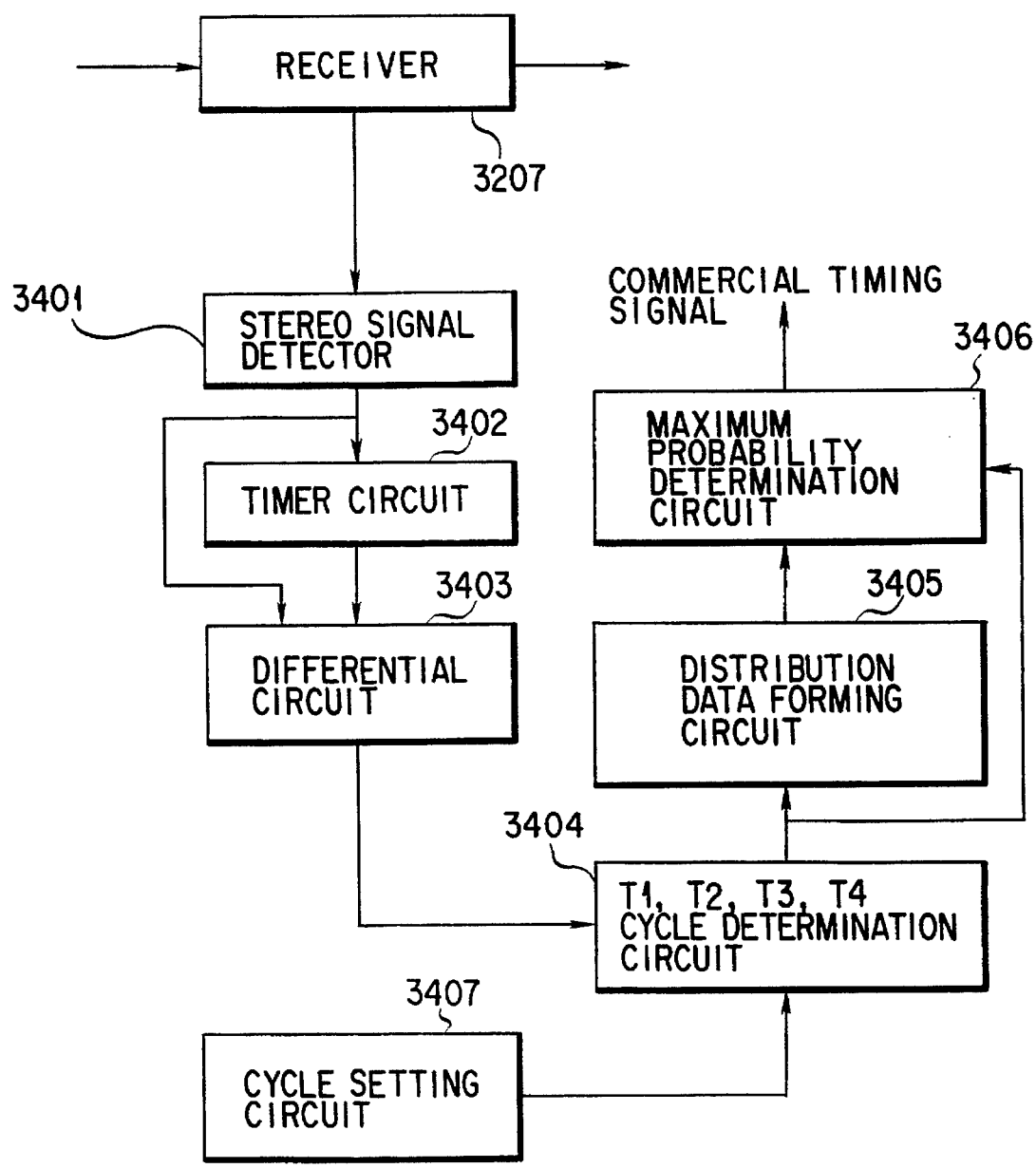
F I G. 14

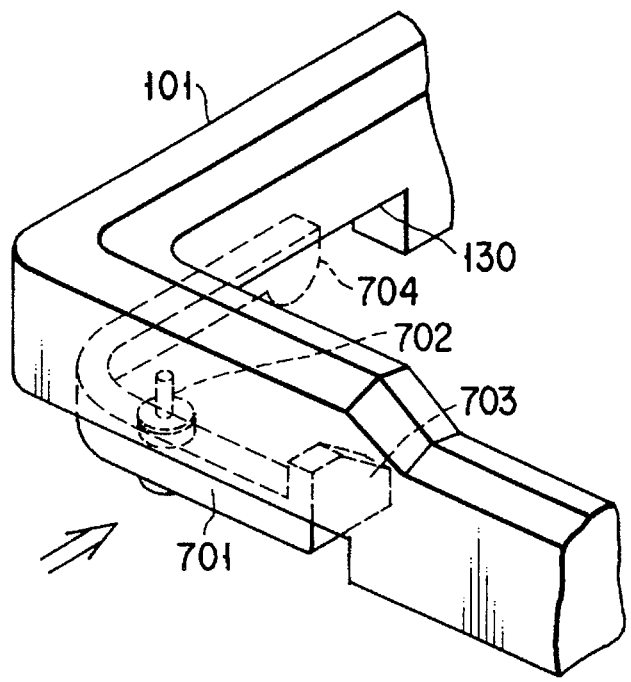
F I G. 18A
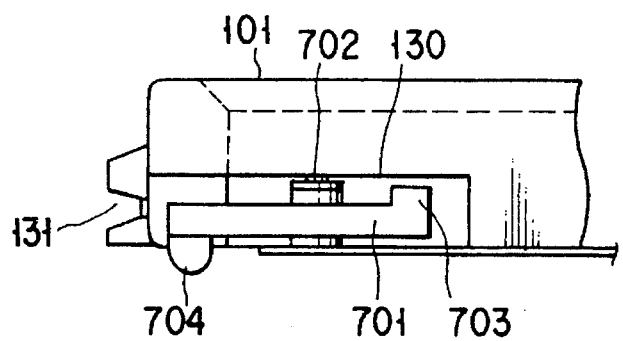
F I G. 18B

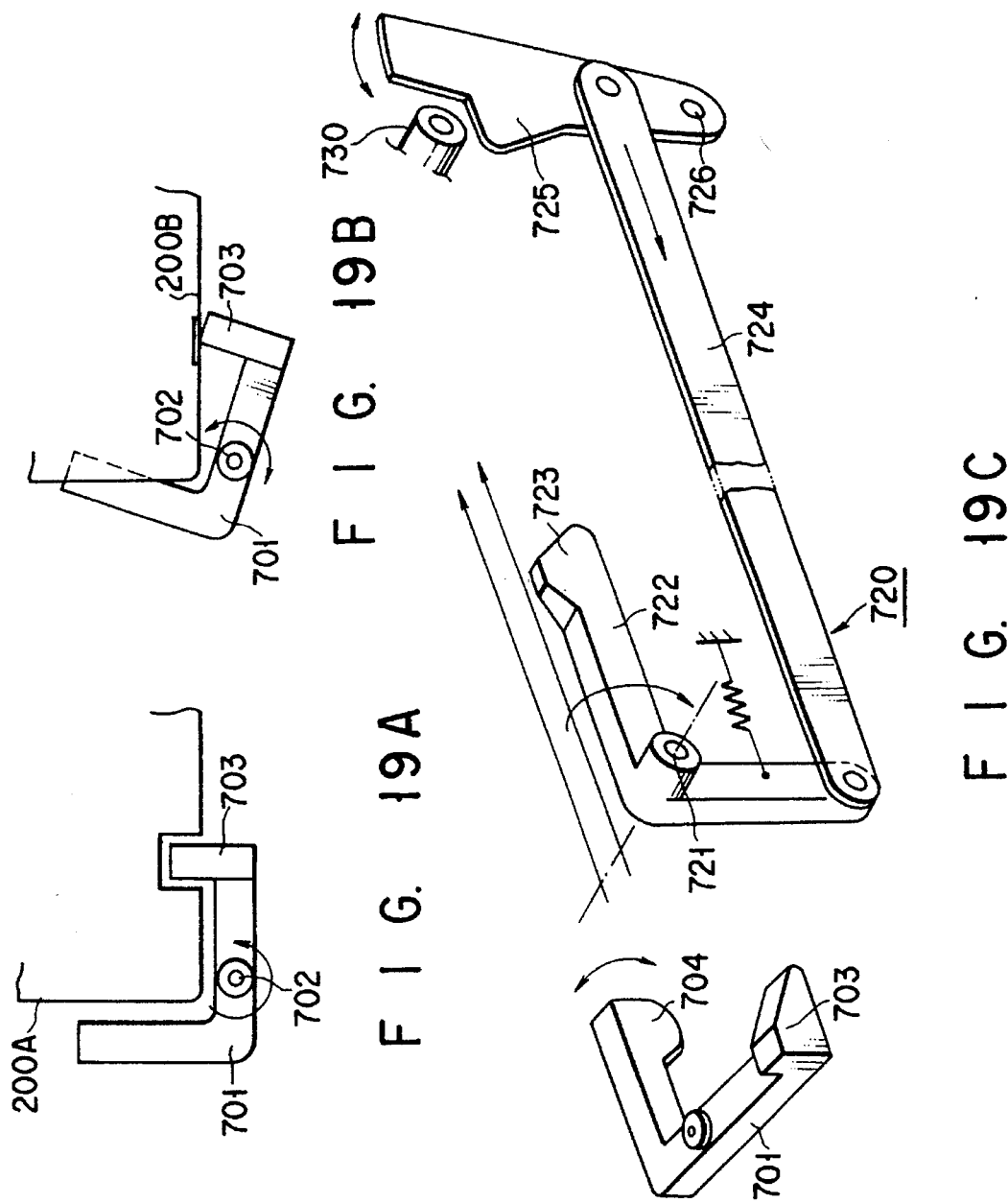

MANAGEMENT APPARATUS FOR A PLURALITY OF CASSETTES

This is a continuation of application Ser. No. 07/842,447, filed on Feb. 27, 1992, which was abandoned upon the filling hereof.

BACKGROUND OF THE INVENTION

1. Field of the Invention

The present invention relates to a use management apparatus for a plurality of cassettes, assembled in, e.g., a video tape recorder (to be abbreviated to as a VTR hereinafter), a digital audio tape recorder (to be abbreviated to as a DAT hereinafter), and the like, for, when these recorders have a function of automatically exchanging a plurality of cassettes, managing, e.g., a use order of the cassettes.

2. Description of the Related Art

In recent years, many television programs tend to be long. In addition, with the advent of satellite broadcast, programs broadcast around or after midnight are becoming increasingly popular. For this reason, VTRs tend to have a recording mode allowing a long-time recording operation during a user's absence.

However, since an existing VTR can load only one tape cassette, a long-time recording operation, or a recording capacity for an absent recording operation, is limited. Since the cassette size is standardized, limitations are imposed on the manufacture of large-capacity cassette tapes. In order to solve these problems, in some proposals, VTRs are arranged to be able to load a plurality of cassettes.

When VTRs are arranged to be able to load a plurality of cassettes, however, various means for associating various functions of VTRs with a plurality of cassettes are required.

For example, when a long-time recording or play operation is performed using a plurality of cassettes, a cassette automatic exchange function must be managed. In addition, the use order of the cassettes must also be managed. However, when the use order of the cassettes is always automatically determined, it is sometimes inconvenient for a user, resulting in poor versatility in VTR cassette management.

SUMMARY OF THE INVENTION

It is, therefore, an object of the present invention to provide a use management apparatus for a plurality of cassettes, which can determine the use order of cassettes not only automatically but also manually, and has high versatility in management of the use order of cassettes.

In order to achieve this object, according to the present invention, a use management apparatus for a plurality of cassettes, comprises cassette convey control means for selectively conveying and mounting one of a plurality of cassettes to a tape driving section, and feeding a mounted tape outside an equipment, use cassette determination/control means for controlling the cassette convey control means in response to input information, and determining a cassette to be mounted on the tape driving section by the cassette convey control means, manual operation data input means for outputting first input information as the input information according to an operation input, automatic operation data input means for selecting second input information as the input information from prestored operation data, and outputting the selected information, and selection means, which can select one of the first input information and the second input information according to a switching operation, and inputs the selected input information to the use cassette determination/control means.

With the above-mentioned means, when the next cassette is mounted on the tape driving section, it can be selected whether the use order of cassettes is set automatically or if a user desirably determines cassettes to be used, and a plurality of cassettes can be handled as a series of cassettes or separate cassettes.

It is another object of the present invention to provide a use management apparatus for a plurality of cassettes, which can properly determine an exchange timing of a cassette in a standby state and a cassette in an active state when a plurality of cassettes are mounted in an equipment.

In order to achieve this object, according to the present invention, a use management apparatus for a plurality of cassettes, comprises cassette convey control means, which can selectively convey and mount one cassette from a group of cassettes which are, respectively carried on a plurality of carrying positions, to a tape driving position, carry a mounted cassette outside an equipment, use cassette determination/control means for determining a use cassette to be mounted on a tape driving section in response to input information, and controlling the cassette convey control means to mount the determined use cassette on the tape driving section, cassette selection setting means for inputting cassette selection information for designating the use cassette of the plurality of cassettes, operation mode input means for inputting operation mode information (recording or play instruction/information and the like) of the cassette mounted on the tape driving section, and exchange operation timing setting means for, only when the cassette selection information and the operation mode information are input, supplying these pieces of information to the use cassette determination/control means as the input information.

With these means, a cassette exchange operation is executed only when two pieces of information, i.e., the cassette selection information and the operation mode information are input. Therefore, an unnecessary cassette exchange operation can be prevented when a cassette is selected in, e.g., a timer setting mode.

The cassette selection information input means can be used as a cassette designation unit for a timer operation of the timer setting mode, and a cassette designation unit used in a normal operation instruction mode.

It is still another object of the present invention to provide a use management apparatus for a plurality of cassettes, which can measure a tape remaining amount serving as a condition for selecting one of cassettes in a standby state in a free time when a plurality of cassettes are mounted in an equipment.

In order to achieve this object, according to the present invention, a use management apparatus for a plurality of cassettes, comprises cassette convey control means, which can selectively convey and mount one cassette from a group of cassettes which are respectively carried on a plurality of carrying positions, to a tape driving section, and carry a mounted cassette outside an equipment, cassette information storage means for storing presence/absence information of the cassette at the plurality of carrying positions of the cassette convey control means, and presence/absence information of safety lugs of the cassettes, use cassette determination/control means for determining a use cassette by checking input information, and controlling the cassette convey control means to mount the use cassette on the tape driving section, timer reservation information storage means for storing a set of designation information from timer cassette reservation means for outputting the designation information of a cassette to be subjected to a timer operation among the cassettes, and timing information from timer operation time input means, comparison means for comparing time information input from time measurement means and the timing information stored in the timer reservation information storage means, and tape remaining amount measurement means for measuring tape remaining amounts of the cassettes to be stored in the cassette information storage means during a period for which the comparison means outputs a non-coincidence output.

With the above-mentioned means, tape remaining amount information of all the cassettes can be reliably ascertained, and when the next use cassette is selected, the tape remaining amount information can be effectively utilized.

It is still another object of the present invention to provide a use management apparatus for a plurality of cassettes, which can also manage tracking adjustment data of each cassette when a plurality of cassettes are selectively driven.

In order to achieve this object, according to the present invention, a use management apparatus for a plurality of cassettes, comprises cassette convey control means, which can selectively convey and mount one cassette from a group of cassettes which are respectively carried at a plurality of carrying positions, to a tape driving position, and carry a mounted cassette outside an equipment, cassette information processing/storage means for storing cassette information such as presence/absence information of the cassettes at the carrying positions of the cassette convey control means, the presence/absence of safety lugs of the cassettes, tape position data of the cassettes, tape tracking adjustment data of the cassettes, and the like, at addresses corresponding to the carrying positions, and means for, when the cassette convey control means is controlled to mount one of the cassettes on a tape driving section, reading out the cassette information corresponding to the carrying position of the selected cassette from the cassette information processing/storage means, and supplying at least the corresponding tracking adjustment data to tracking adjustment data processing/ setting means.

With the above-mentioned means, when a cassette exchange operation is performed, proper tracking characteristics of a cassette in an active state can be obtained.

It is still another object of the present invention to provide a use management apparatus for a plurality of cassettes, which automatically measures and checks a tape remaining amount when a plurality of cassettes is mounted in an equipment, and one of these cassettes is selectively mounted on a tape driving section.

In order to achieve this object, according to the present invention, a use management apparatus for a plurality of cassettes, comprises cassette convey control means for selectively conveying and mounting one of a plurality of cassettes to a tape driving section, and carrying a mounted cassette outside an equipment, means for, when the selected cassette is mounted on the tape driving section, operating a tape driving system and tape remaining amount measurement means, cassette information storage means for storing the tape remaining amount data of the cassettes obtained from the tape remaining amount measurement means, and control means for reading out the tape remaining amount data stored in the cassette information storage means, and controlling a cassette convey operation of the cassette convey control means.

With the above-mentioned means, the tape remaining amount of a cassette to be used can be accurately determined, and tape remaining amount information can be accurately managed.

It is still another object of the present invention to provide a use management apparatus for a plurality of cassettes, which measures the tape remaining amount of a cassette designated by an operation input means last of all when a plurality of cassettes are mounted in an equipment, and a tape remaining amount measurement mode of the cassettes is designated, thereby shortening a mode shift time upon input of a start instruction.

In order to achieve this object, according to the present invention, a use cassette management apparatus for a plurality of cassettes, comprises cassette convey control means for selectively conveying and mounting one of a plurality of cassettes to a tape driving section, and carrying a mounted cassette outside an equipment, tape remaining amount measurement means for, when the selected cassette is mounted on the tape driving section, measuring a tape remaining amount upon operation of a tape driving system, cassette information storage means for storing the tape remaining amount data of the cassettes obtained from the tape remaining amount measurement means, control means for reading out the tape remaining amount data stored in the cassette information storage means, and controlling a cassette convey operation of the cassette convey control means, cassette selection setting means for supplying cassette selection data for designating a specific cassette to be used to the control means and final cassette setting means included in the control means, for, when the cassette selection data for designating the specific cassette to be used is supplied, and when the cassette convey control means is controlled to perform the tape remaining amount measurement, controlling the cassette convey control means to mount the specific cassette on the tape driving section last of all so as to perform the tape remaining amount measurement thereof.

With the above-mentioned means, when a recording or play start instruction is input, since a designated cassette has already been prepared on the tape driving section, the system can quickly start the recording or play mode.

It is still another object of the present invention to provide a use management apparatus for a plurality of cassettes, which can exchange a cassette during a commercial period of a recorded program.

In order to achieve this object, according to the present invention, a use management apparatus for a plurality of cassettes, comprises cassette convey control means, which can hold a plurality of cassettes inserted in an equipment in a standby state, and can move one of the plurality of cassettes to a position, where the cassette can be mounted on a predetermined tape driving section, according to an operation instruction signal, fetching means for fetching a recording signal to be recorded, timing means for receiving the signal from the fetching means, discriminating a timing corresponding to a commercial signal, and obtaining a commercial timing signal, and discrimination means for, when the commercial timing signal is input, controlling the cassette convey control means to exchange the cassette on the tape driving section with another cassette.

With the above-mentioned means, a program to be recorded over a plurality of cassettes can be recorded to have a continuous content without omissions.

It is still another object of the present invention to provide a use management apparatus for a plurality of tapes, which monitors a tape remaining amount to automatically control a tape speed, thereby obtaining a margin for a remaining time for a recording operation.

In order to achieve this object, according to the present invention, a use management apparatus for a plurality of cassettes, comprises cassette convey control means for selectively conveying and mounting one of a plurality of cassettes to a tape driving section, and carrying a mounted cassette outside an equipment, tape position data detection means for, in a state wherein an active cassette selected from the plurality of cassettes is mounted on the tape driving section, and a tape thereof is driven, detecting tape position data of the active cassette, calculation means for calculating a remaining recording time using the tape position data of the active cassette obtained from the tape position data detection means, and means for, when the remaining recording time obtained from the calculation means becomes not more than a predetermined period of time, decreasing a tape driving speed of the tape driving section.

With the above-mentioned means, when the tape remaining amount becomes small, the tape speed can be decreased, thus preventing a recording error.

BRIEF DESCRIPTION OF THE DRAWINGS

FIGS. 2A and 2B show memory tables in a cassette information storage means and a timer information storage means shown in FIG. 1;

FIGS. 4A and 4B are flow charts of a program used in the system of the present invention;

FIG. 6 is a flow chart of a program used in the system of the present invention;

FIG. 7 is a flow chart of a program used in the system of the present invention;

FIG. 10 shows a memory table in a cassette information storage means shown in FIG. 9;

FIG. 12 shows a memory table of a cassette information storage means shown in FIG. 11;

FIG. 14 is a partial detailed block diagram of a discrimination circuit and an exchange device shown in FIG. 13;

FIGS. 18A and 18B are explanatory views showing the arrangement of a safety lug detecting unit provided in association with the tray unit;

FIGS. 19A to 19C are views for explaining the operation of the safety lug detecting unit.

DETAILED DESCRIPTION OF THE PREFERRED EMBODIMENTS

An embodiment of the present invention will be described hereinafter with reference to the accompanying drawings.

Figure 1:
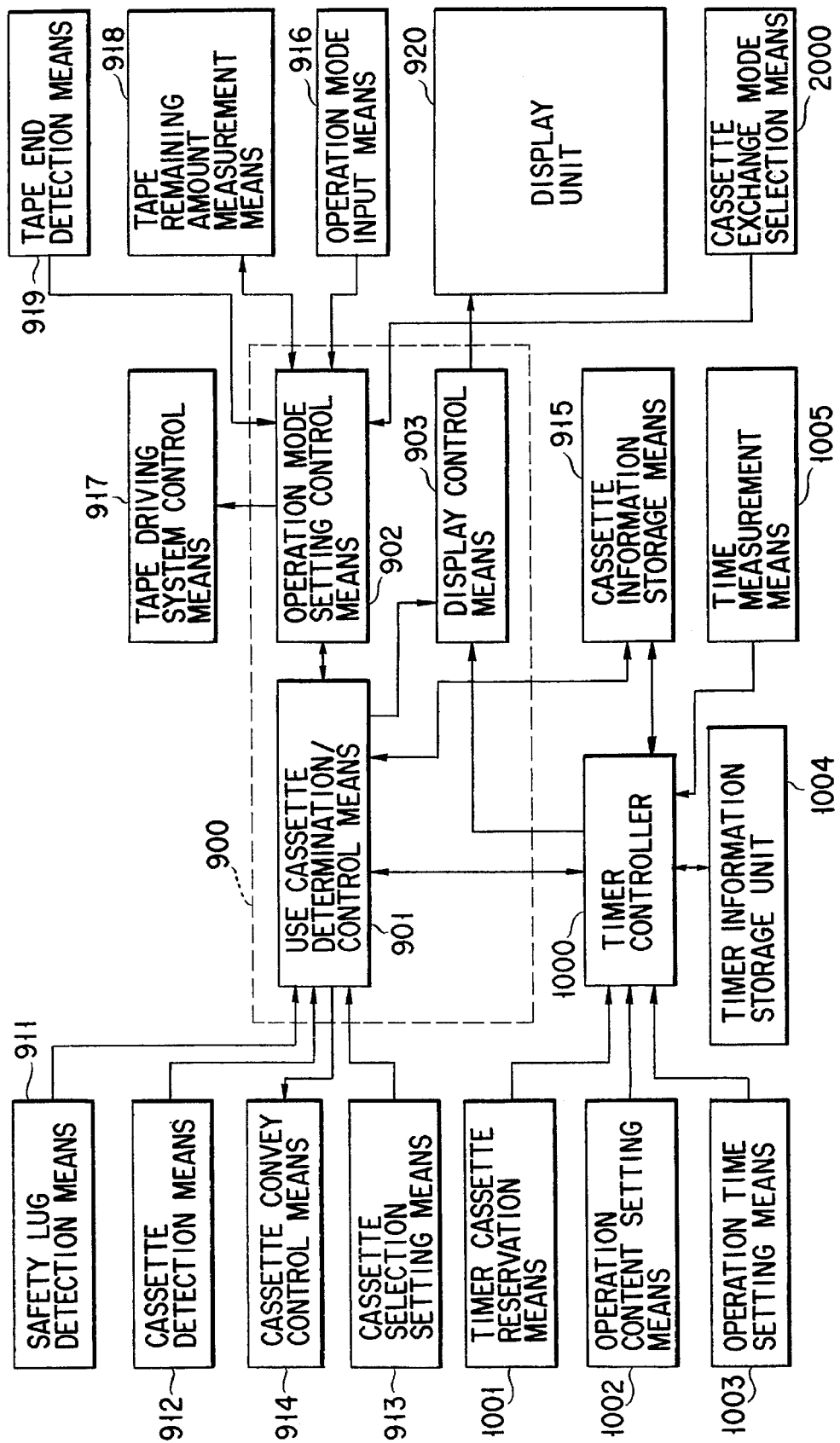
FIG. 1 is a system block diagram showing an embodiment of the present invention.

FIG. 1 is a block diagram showing a VTR system according to an embodiment of the present invention, which can load a plurality of cassettes in advance. The VTR capable of loading a plurality of cassettes herein assumes an apparatus, which can place a plurality of cassettes on a tray unit, and can selectively and automatically convey and set a cassette to be subjected to a recording or play operation to a tape driving section. The detailed arrangement of the VTR will be described later, and a timer management system will be explained first.

Reference numeral 900 denotes a system controller, which employs a microcomputer. The system controller 900 fetches and processes pieces of information from respective units of the system, and also stores programs for controlling the functions of the respective units according to predetermined conditions. FIG. 1 illustrates only some functions convenient for a description as blocks, i.e., a use cassette determination/control means 901, an operation mode setting/control means 902, and a display control means 903.

A generation source of information to be input to the use cassette determination/control means 901 will be described below. The use cassette determination/control means 901 receives detection information from a safety lug detection means 911, cassette detection information from a cassette detection means 912, and information from a cassette selection setting means 913. The use cassette determination/control means 901 also fetches information from the operation mode setting/control means 902, and information from a tape end detection means 919 through the operation mode setting/control means 902.

Furthermore, the use cassette determination/control means 901 receives information from a timer controller 1000 for performing processing of a timer mode, cassette discrimination, and the like.

The safety lug detection means 911 detects the presence (recording enable)/absence (recording disable) of a safety lug provided to a cassette placed on each mount area of the tray unit in units of cassettes, and inputs the detection information to the use cassette determination/control means 901. The cassette detection means 912 detects whether or not a cassette is placed on each mount area, and inputs the information to the use cassette determination/control means 901. The cassette selection setting means 913 supplies information of a cassette designated by a user from a plurality of mounted cassettes to the use cassette determination/control means 901. The use cassette determination/control means 901 discriminates conditions of pieces of input information so as to control a cassette convey control means 914 to set a cassette selected from the plurality of cassettes to a tape driving position. In this manner, the selected cassette can be set in a recording or play state.

The pieces of information input to the use cassette determination/control means 901 are converted into a table, and the table is input to a cassette information storage means 915. The information in the cassette information storage means 915 can also be supplied to the use cassette determination/control means 901. The operation mode setting/control means 902 receives operation information from an operation mode input means 916. For example, the operation information includes instruction signals for instructing a recording mode, a recording tape speed setting mode, a play mode, a fast forward mode, a rewind mode, a stop mode, a high-speed play mode, a slow or double-speed play mode, and a tape remaining amount measurement mode.

When an instruction signal for instructing the tape remaining amount measurement mode is input, the operation mode setting/control means 902 inputs the input information to the use cassette determination/control means 901. The use cassette determination/control means 901 discriminates the presence/absence of mounted cassettes (looks up the table in the cassette information storage means 915). If the means 901 detects the corresponding cassette, it controls the cassette convey control means 914 to load the cassette to a predetermined tape driving position. When the cassette is loaded, the operation mode setting/control means 902 controls a tape driving system control means 917 to drive a tape, and also controls a tape remaining amount measurement means 918 to measure the tape remaining amount during the tape driving operation. After the tape remaining amount is measured, tape remaining amount data of the corresponding cassette is stored in the cassette information storage means 915 as information of the corresponding cassette. In this manner, the tape remaining amounts of loaded cassettes are measured in turn, and pieces of information in units of cassettes are stored in the cassette information storage means 915.

When no cassette is loaded in the VTR, since information detected by the cassette detection means 912 is stored in the cassette information storage means 915, no remaining amount measurement is performed. In this case, the absence of a cassette is displayed on a corresponding cassette display section through the display control means 903 and a display unit 920.

The tape remaining amount measurement mode includes a mode for obtaining the tape remaining amounts of all the loaded cassettes, and a mode for measuring the tape remaining amount of a non-measured cassette or cassettes without measuring the measured cassette or cassettes. In this system, as will be described later, the tape remaining amount is measured under a predetermined condition, and tape remaining amount data is preserved. The preserved data is effectively utilized in a timer recording operation later.

In a normal recording/play mode (excluding a case during execution of a timer operation), a user designates a cassette through the cassette selection setting means 913, and an operation signal from the operation mode input means 916 is input to the system controller 900. When this condition is satisfied, the designated cassette is mounted on the tape driving section, and the system is operated in the designated mode.

In this case, an exchange operation of a cassette mounted on the tape driving section is programmed to be started only when both a cassette designation instruction and an operation signal indicating an operation content are input. In this manner, a safety measure is taken to prevent an unnecessary cassette exchange operation when only cassette designation is made. As will be described later, when a timer operation program is reserved, a reservation cassette must be designated. Thus, in such a cassette designation operation, a cassette can be prevented from being unexpectedly exchanged.

Since a plurality of cassettes are mounted, they must be exchanged in a long-time recording or play operation, or in a timer operation. In this case, it is preferable to obtain an optimal selection order of exchange cassettes according to an operation content such as the recording or play mode. Thus, this system has a use cassette automatic order setting function (automatic use cassette determination means) in which the system itself judges the exchange order of cassettes, and performs the exchange operation, and a manual setting function (manual use cassette determination means) in which a user can desirably select a use cassette as needed. One of these functions to be operated can be determined by a selection means 2000.

When a use cassette is to be manually selected, a user can determine it with reference to cassette information displayed on the display unit 920. More specifically, cassette information in the cassette information storage means 915 can be read out and displayed on the display unit 920 through the use cassette determination/control means 901 and the display control means 903. This display operation may always be performed, or may be performed according to an instruction from the operation mode input means 916, as needed.

The cassette automatic order setting function includes a flexible order setting mode for automatically selecting an optimal cassette on the basis of cassette information such as presence/absence information of a safety lug of a cassette, tape remaining amount information, and the like, and a fixed order setting mode for setting cassettes in a predetermined order.

This system has a function of measuring the tape remaining amount, and the tape remaining amounts of a plurality of cassettes can be stored in a cassette information storage means. The tape remaining amount measurement function must be executed not only for one cassette but also for a plurality of cassettes. For this reason, the tape remaining amount can be automatically measured except for a timer execution time. Thus, tape remaining amount information can be effectively utilized in a timer operation. The automatic tape measurement function is enabled like in a case wherein the VTR is left in a timer standby mode for a recording operation.

Reservation and operation functions associated with a timer are managed by the timer controller 1000.

The timer controller 1000 receives timer information from a timer cassette reservation means 1001, an operation content setting means 1002, and an operation time setting means 1003, and the timer information is stored in a timer information storage unit 1004. The timer cassette reservation means 1001 can designate a cassette to be subjected to a timer operation. The operation content setting means 1002 can output operation content information for setting an operation content of the system indicating whether a recording or play operation is performed for a cassette to be used upon timer execution. The operation content setting means 1002 can also output operation content information for setting a tape speed on the recording mode. Furthermore, the operation time setting means 1003 can output timer time information for setting a timer execution time (start time and end time). Although not shown, signals from a timer reservation switch for performing timer reservation and a timer cancel switch for canceling timer reservation can also be input to the timer controller 1000.

The timer controller 1000 can input and store cassette designation information for designating a cassette to be subjected to a timer operation, operation content information, timer time information, and the like in the timer information storage unit 1004. The timer controller 1000 receives time data from a time measurement means 1005. The time measurement means generates current time and date information. Therefore, when timer time information (start information) coincides with the current time information, the timer controller 1000 basically inputs cassette designation information and operation content information corresponding to the timer time information to the use cassette determination/control means 901. Then, the use cassette determination/control means 901 sets a recording or play state of a designated cassette. When the timer time information (end information) coincides with the current time information, the timer controller 1000 supplies timer operation end information to the use cassette determination/ control means 901.

The timer controller 1000 can access the cassette information storage means 915 to acquire data therefrom, and can also manage a content to be displayed on the display unit 920 through the display control means 903.

FIG. 2A shows a cassette information table formed in the cassette information storage means 915. Numbers or codes are set in this table according to the cassette mount positions (e.g., positions in the tray unit capable of loading a plurality of cassettes in advance). This case exemplifies codes A, B, C, . . . . These codes correspond to cassette identification codes. According to the mount positions, cassette presence/ absence information, detection information indicating a recording enable or disable state, remaining amount information, and the like are stored.

FIG. 2B shows a timer information table formed in the timer information storage unit 1004. In the column of "designated cassette", designated cassette information input from the timer cassette reservation means 1001 is set. In the column of "operation content", operation content information in a timer operation is set. In the column of "start", timer start time information is set. In the column of "end", timer end time information is set. Data stored in the column of "designated cassette" is the same as the cassette identification code.

Note that a timer reservation operation using a remote controller has been increasingly popular. In this case, since the number of control inputs of a microcomputer for controlling a remote control hand unit is limited, information for specifying a cassette can be omitted from timer information handled by the remote controller. More specifically, when the cassette selection setting means of a VTR main body selects a cassette, a timer reservation operation for the cassette selected at the main body side can be realized at the remote controller side by the same operation as a timer reservation operation using a remote controller in a conventional VTR that handles only one cassette. This can save labor for designing a new remote control hand unit for a VTR which manage a plurality of cassettes, thus providing economical advantages.

Upon completion of one program reservation operation for one cassette, the other cassette may be automatically selected by the cassette selection setting means. With this arrangement, when a play or recording operation using the other cassette, which is not a timer reservation object, is to be performed in a timer standby mode automatically set upon completion of the program reservation operation, the cassette selection/setting operation need not be performed.

The respective functions will be described in detail below.

Figure 3:
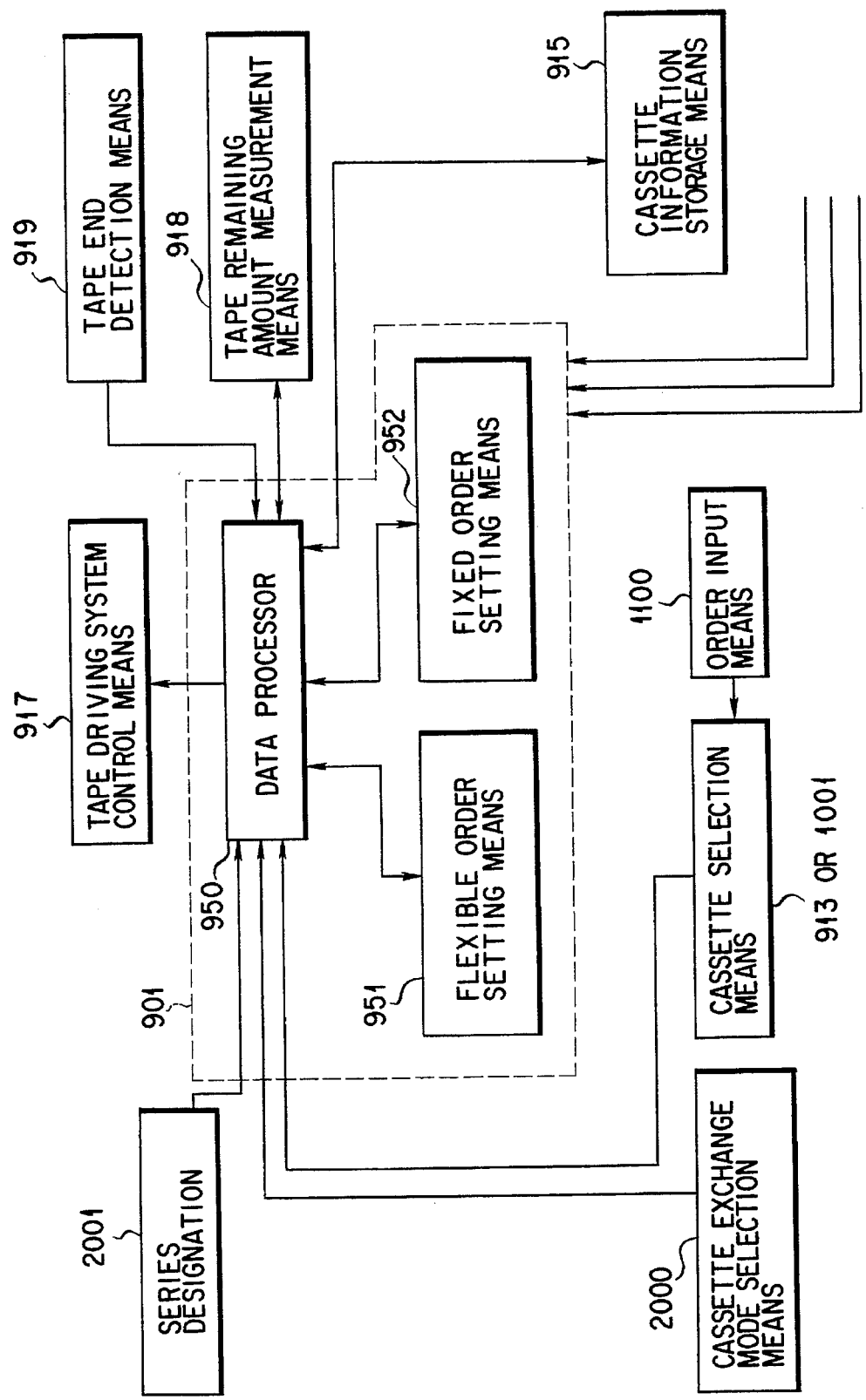
FIG. 3 is a partial detailed block diagram of FIG. 1.

FIG. 3 shows blocks associated with the automatic cassette exchange function in the use cassette determination/ control means 901. A data processor 950 can receive data from the tape remaining amount measurement means 918 described above, and can also control the operation of the tape remaining amount measurement means 918. Furthermore, the data processor 950 can store and read out tape remaining amount information in and from the cassette information storage means 915. The data processor 950 receives a tape end detection signal from a tape end detection means 919. Furthermore, the data processor 950 can receive information from the cassette exchange mode selection means 2000, information from the series designation means 2001, and information from the cassette selection setting means 913 or the timer cassette reservation means 1001.

The series designation means 2001 is provided for setting a series designation mode to use a plurality of cassettes, and this means may be provided in the cassette exchange mode selection means 2000.

FIG. 1 separately illustrates the cassette selection setting means 913 and the timer cassette reservation means 1001. However, these means are functions of designating a cassette, and may be constituted by a common means (reference numeral 913 will be used hereinafter to designate the common means). Furthermore, the cassette selection setting means 913 receives a signal from an order input switch 1100. When the order input switch 1100 is turned on, fixed order data from the cassette selection setting means 913 can be input to the data processor 950. Upon reception of the fixed order data, the data processor 950 stores it in a fixed order setting means 952. When a detection signal (regulation signal) is received from, e.g., the tape end detection means 919 during the recording or play operation of the VTR, the data processor 950 controls the tape driving system control means 917 to start the cassette exchange operation. In this case, the next cassette must be determined. As a determination method, one of two modes can be selected in this system.

More specifically, the method of determining the next active cassette includes a method of looking up order data set in the fixed order setting means 952, and a method of flexibly determining the order by a flexible order setting means 951. Whether the next cassette is selected based on data in the fixed order setting means 952 or by the flexible order setting means 951 is determined according to data input from the cassette exchange mode selection means 2000 (this selection is made by a user).

FIG. 4A shows a program executed when tape regulation data is input to the data processor 950. When a tape end detection signal is input (step S1), it is checked if series (recording or play) designation is made (step S2). In the following description, assume that recording designation is made. If series designation is not made, the recording operation is stopped. However, if series designation is made, information from the cassette exchange mode selection means 2000 is checked (step S3). If the fixed order mode is set, the next cassette is selected according to data in the fixed order setting means 951. More specifically, the data processor 950 controls the tape driving system control means 917 to mount a cassette having the next order on the tape driving section.

Contrary to this, if the flexible order setting means 952 is selected, for example, the presence/absence of a cassette, the presence/absence of a safety lug, and a tape remaining amount are checked, thereby determining the next cassette (step S5).

FIG. 4B is a flow chart executed when the next cassette is selected by the flexible order setting means 951. When flexible order setting processing is started, the content of the cassette information storage means 915 is accessed (step S11). In this case, the pieces of information shown in FIG. 2A are checked in a predetermined order. That is, the presence/absence of a cassette, the presence/absence of a safety lug, whether or not the tape remaining amount is a given amount are checked. If these conditions are satisfied, processing (step S12) for mounting a corresponding cassette on the tape driving section is executed. On the other hand, if the conditions are not satisfied, the presence/absence of the next cassette is checked (step S13). If the next cassette is present, it is checked if pieces of information corresponding to the cassette satisfy the conditions. If it is determined in step S13 that the next cassette is absent, alarm processing (step S14) is performed, and the apparatus is stopped.

According to the above-mentioned system, the VTR can be used as follows in the recording mode.

More specifically, when recording contents are to be recorded on separate cassettes in correspondence with genres, the cassettes can be designated by the fixed order setting means 952. When a long-time recording operation is to be performed, a plurality of cassettes can be handled as if they were a single cassette when the flexible order setting means 951 is designated.

On the other hand, the VTR can be used as follows in the play mode. The cassettes can be designated by the fixed order setting means 952, so that programs recorded on a plurality of cassettes can be played back in an order according to a user's favor.

In a timer recording or play operation, the above-mentioned order setting means can also be effectively utilized. In the recording mode using a timer, the flexible order setting mode may be automatically selected to assure a safe recording operation. In the play mode using a timer, the fixed order setting mode may be automatically selected to attain a play order as the user desires.

In the above description, the flexible order setting means 951 and the cassette selection setting means 913 are operated independently of each other. However, these means may be related to each other. For example, the order input from the cassette selection setting means 913 may be utilized as a potential order used when the flexible order setting means 951 searches the next cassette. In this case, even when the flexible order setting means is erroneously selected in the timer recording mode although the fixed order setting means should be selected, the order selected by the flexible order setting means can coincide with the order in the fixed order setting means, resulting in convenience.

In addition, order setting information from an order setting means may be input to the flexible order setting means 951, so that the order of cassettes can be arbitrarily determined.

The above-mentioned system has a timer setting function, and also has a means for attaining a smooth timer setting operation.

The pieces of information output from the cassette selection setting means 913 and the timer cassette reservation means 1001 shown in FIG. 1 have the same format. Therefore, one of these means may be omitted. In this case, when a cassette is designated by utilizing the cassette selection setting means 913 in a timer reservation mode, since the system controller 900 has a function of mounting the designated cassette on the tape driving section, an unnecessary operation is performed if this function is permitted. In the timer reservation mode, a reserved cassette need not often be immediately moved to the tape driving section (especially when a timer reservation operation is performed for a plurality of cassettes).

Thus, when the data processor 950 controls the tape driving system control means 917, this system is set to start the cassette mounting operation in a mode other than the timer mode only when information from the cassette selection setting means 913 and an operation designation signal from the operation mode input means 916 are input.

Figure 5A:
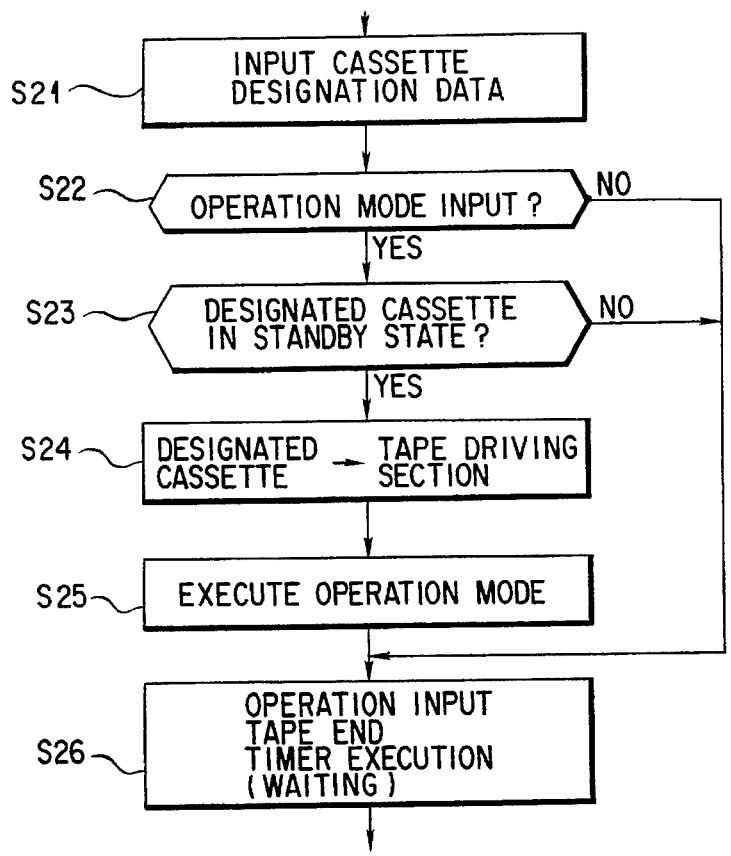
FIGS. 5A and 5B are flow charts of a program used in the system of the present invention.

FIG. 5A shows a program for assuring the above-mentioned operation safety. If cassette designation data is input in step S21, it is checked if data for designating an operation mode (a recording mode, a play mode, a rewind mode, a fast forward mode, or the like) is input (step S22). If YES in step S22, it is checked if a designated cassette is in a standby state or has already been mounted on the driving section (step S23). If it is determined in step S23 that the designated cassette is in the standby state, the designated cassette is conveyed to and mounted on the tape driving section, and an operation content according to the input operation mode is executed (step S25). Thereafter, the control waits for the next operation mode input, input information such as a tape end detection signal, or the like (step S26).

Figure 5B:
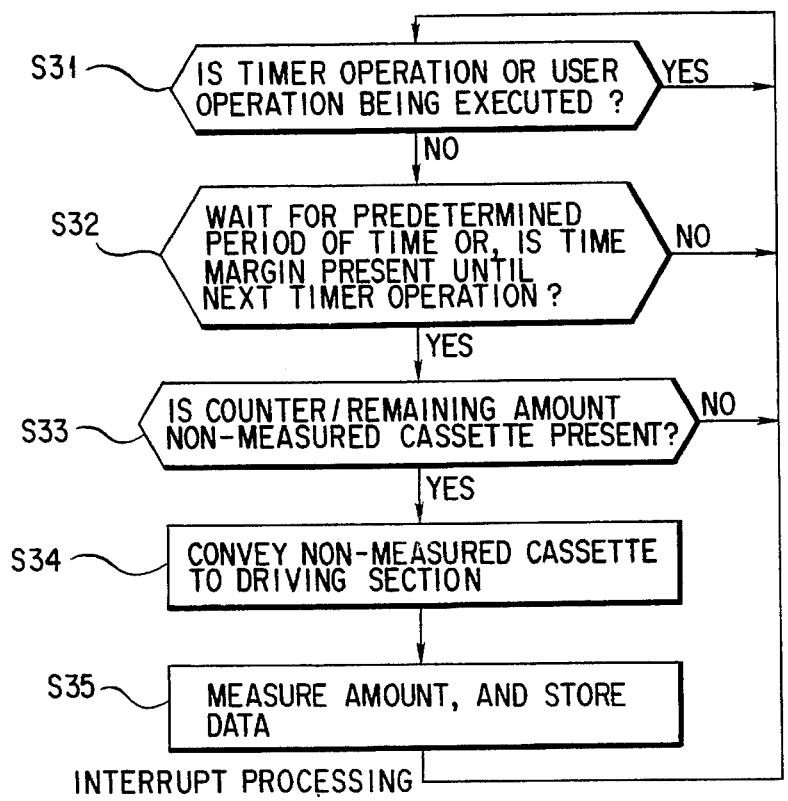

The above-mentioned system has a function of automatically measuring a tape remaining amount if there is a cassette whose tape remaining amount to be stored in the cassette information storage means 915 is not measured. FIG. 5B shows a tape remaining amount measurement program.

This program is executed at given cycles, or periodically as interrupt processing during a predetermined period after a cassette is loaded to the VTR. It is checked if a timer operation or a user operation is being executed (step S31). If NO in step S31, the control waits for a predetermined period of time, or it is checked if there is a time margin until the next timer operation (step S32). The time margin until the next timer operation can be detected upon comparison between the current time and timer start time data closest to the current time. If there is a time margin, it is searched if there is a cassette whose tape remaining amount is not measured (step S33). This searching operation can be realized by checking the content of the cassette information storage means 915. If there is a non-measured cassette, the cassette is conveyed to the tape driving section, and its tape remaining amount is measured. The measurement data is then stored in a corresponding area (the table in the cassette information storage means 915).

When the tape remaining amounts of all the cassettes are automatically measured in this manner, these data can be effectively utilized when the flexible order setting means 951 described above selects the next cassette.

The above-mentioned system may incorporate an arithmetic means for associating a tape remaining amount with timer execution time data. For example, a timer recording duration can be obtained by calculating the difference between start and end times. Thus, when the next cassette is to be selected, a cassette having a tape remaining amount satisfying this duration may be searched, and may be mounted on the driving section.

For the timer controller 1000, various safety measures for setting timer reservation, and for executing a timer operation are taken.

FIG. 6 shows a program executed when a timer reservation operation is performed. When the timer reservation mode is set, the control waits for input of a designated cassette. When designated cassette information is input from the timer cassette reservation means 1001, the cassette information storage means 915 is accessed to determine the presence/absence of the corresponding cassette (steps S41 to S43). When the corresponding cassette is absent, an alarm operation (flashing, buzzer, character display, or the like) is performed. In addition, a recordable cassette is searched, and its identification code is displayed (step S44). If no cassette is mounted, feed control of the tray unit is performed. On the other hand, if another cassette is detected, it is waited for a predetermined period of time to check whether or not the timer reservation mode is canceled. If the timer reservation mode is not canceled, the flow returns to step S42; otherwise, the flow returns to step S41. Step S46 is provided to give an opportunity for a user to load a cassette.

If it is determined in step S43 that the corresponding cassette is present, it is determined if the cassette has a safety lug (step S48). If the cassette has a safety lug, and recording is possible, an operation content is fetched, and timer time information is input and fetched (steps S51 and S52). However, if the cassette has no lug, since recording is impossible, alarm processing is performed. In addition, an operation content is fetched to discriminate it (steps S49 and S50). Even when the cassette has no lug, not a recording mode but a play mode may be designated. When the play mode is designated, the flow advances to step S52, and timer time information is fetched. When the timer time information is input, the cassette identification code and pieces of information are paired, and are stored in the timer information storage unit 1004.

FIG. 7 shows a program after the timer recording mode is set.

The current time and timer start time are compared with each other at predetermined time intervals. If the current time coincides with one of start time data stored in the timer information storage unit 1004, it is checked if the identification code of the cassette corresponding to the start time data is stored in the cassette information storage means 915. If the cassette is present, the reserved cassette is conveyed to the driving section in step S67, and the recording operation is started (step S66). If the cassette is not present, the alarm processing is performed. Thereafter, information in the cassette information storage means 915 is looked up to detect a recordable cassette, and the identification code of the detected cassette is displayed (step S63). In step S64, the control waits for a predetermined period of time until a new cassette is inserted. In this case, when the alarm processing is performed, a user may notice this alarm, and may insert a desired cassette. If a cassette is not inserted after an elapse of the predetermined period of time, the previously detected recordable cassette is loaded to the driving section, and the recording operation is started (steps S65 and S66).

After the recording operation is started, the current time and timer end time are compared with each other. If a coincidence is found between the two times, the recording operation is stopped (steps S68 and S69), and the flow returns to step S61. Note that a reserved cassette often has already been loaded to the driving section when a recording operation is started. Thus, although not shown, the control also includes a function of discriminating this state, and a routine for advancing the flow to recording start step S66 without operating the convey function.

Figure 8:
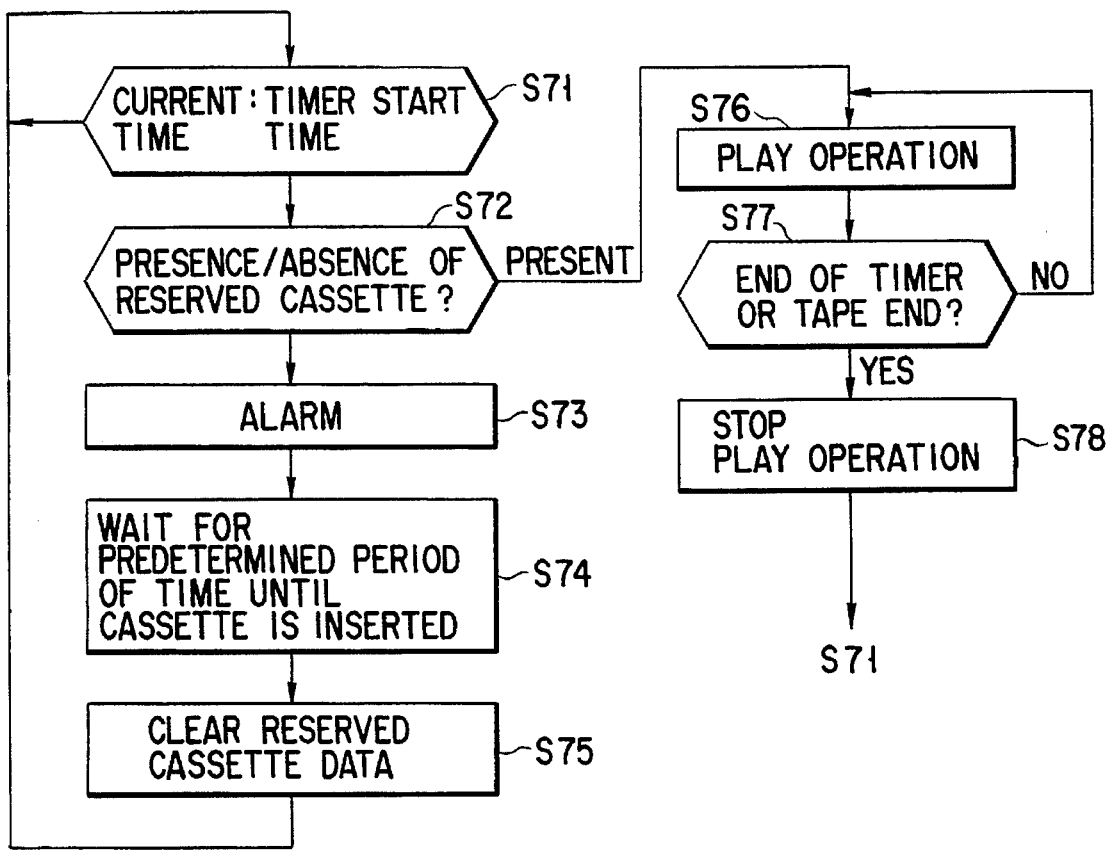
FIG. 8 is a flow chart of a program used in the system of the present invention.

FIG. 8 shows a program executed when the play mode is designated as the timer operation content. When the current time coincides with a timer start time, the presence/absence of the reserved cassette is checked. If the reserved cassette is absent, alarm processing is executed (steps S71, S72, and S73). The control waits for a predetermined period of time until a new cassette is inserted. If a new cassette is inserted, the play mode (step S76) is started. However, if a new cassette is not inserted, data (timer information) associated with the reserved cassette are cleared, and the flow returns to step S71. If it is determined in step S72 that the reserved cassette is present, the flow advances to step S76 to execute the play mode, and comparison between the current time and timer end time is started (step S77). If a comparison result indicates a non-coincidence, it is checked if the tape end is reached. If it is determined that the tape end is not reached, the play operation is continued. If it is determined that the tape end is reached, and the end time coincides with the current time, the play operation is stopped (step S78), and the flow returns to step S71. Note that the tape end information is fetched from the operation mode setting means to the use cassette determination/control means 901, and the timer controller monitors this information.

The above description independently exemplifies the programs executed when both the recording and play modes are designated as the timer operation. However, it is easy to alternately execute recording and play timer operations. In practice, steps S61 and S71 of comparing the current time and timer start time are common to each other, and as the next step, although not shown, the step of discriminating whether the recording or play mode is designated as the operation content is present. If the recording mode is designated, the control enters the routine shown in FIG. 7; otherwise, the control enters the routine shown in FIG. 8.

In the description of the automatic switching function, an output from the tape end detection means is used as a switching reference for the sake of simplicity. Alternatively, a signal blank detection output (corresponding to, e.g., signal blank.silent portion.black frame detection output, or the like of a VTR), or a head/blank detection output (corresponding to a signal blank.silent detection output of an audio cassette, or an INDEX.VISS/VASS output of a VTR) may be used. If the system has a tape remaining amount function, this function may be used solely, or a combination of this function and the above-mentioned detection state or a broadcast signal state may be used. In this case, it is preferable herein to consider the automatic switching function as a cassette state detection means for automatically switching cassettes.

As the functions of the above-mentioned system, a function of monitoring the tape remaining amount, and automatically controlling the tape speed to obtain a sufficient remaining time for a recording operation may be added. In other words, once the series-recording mode has been selected, the total amount of remaining tape in the cassettes is monitored, and the time for which video signals can be recorded on the remaining tape as the tape runs at the designated speed is compared with the time required to record the unrecorded part of the program. If the time monitored is shorter than the time required to record the unrecorded part of the program, the tape-running speed is automatically switched to the low tape-running speed at a predetermined timing. This switching of tape-running speed can be performed while the video signals are being recorded on the tape in the last designated cassette, on the tape in the cassette preceding the last designated one, or on the tape in any other cassette placed in the video tape recorder, depending the time required to record the unrecorded part of the program. With this function, if the tape remaining amount becomes short, since the tape speed is decreased, a recording error can be prevented. A program for checking the remaining amount, and controlling the speed is incorporated in the system controller, and is realized by a tape remaining amount calculation means, a tape speed switching means, and the like.

Figure 9:
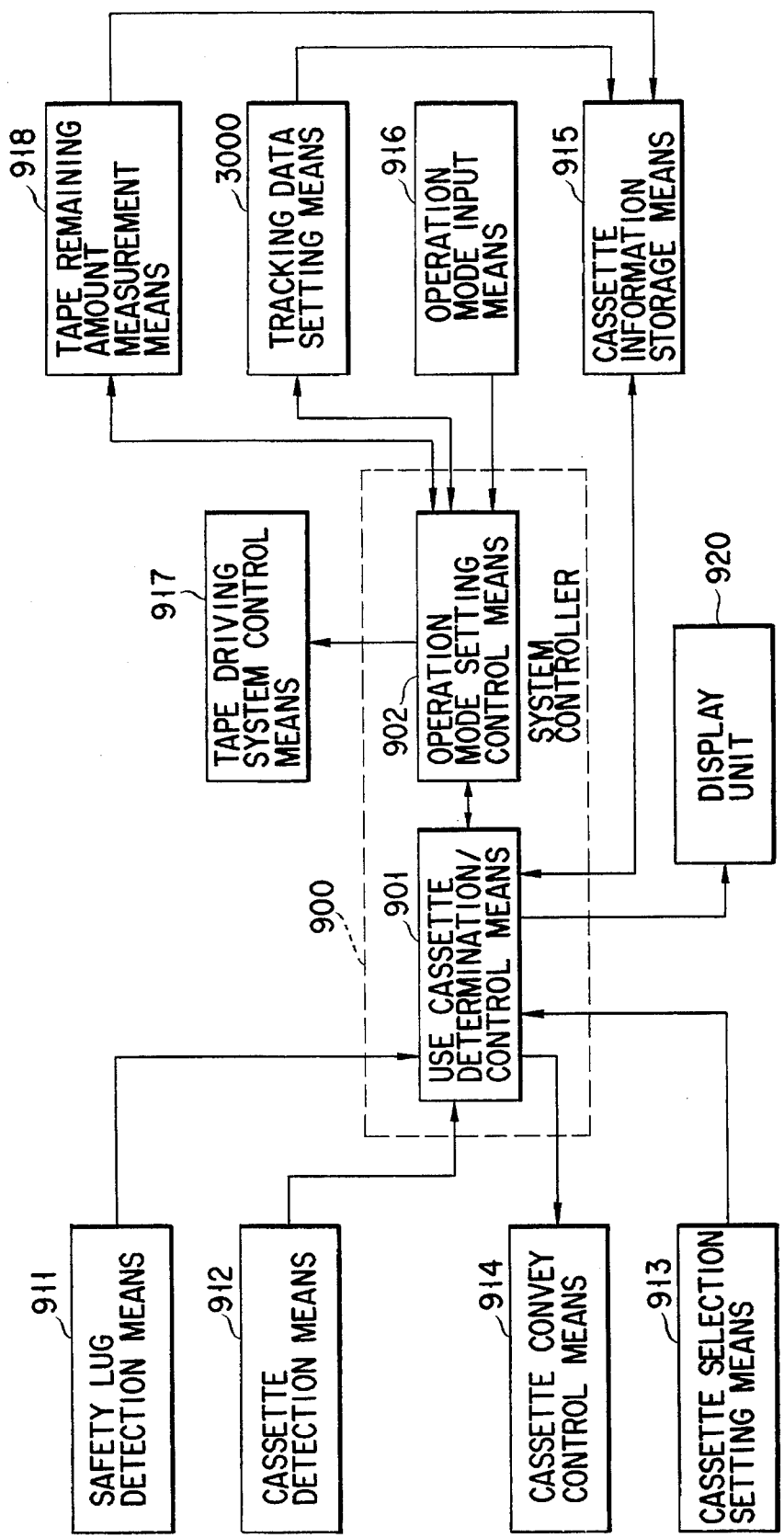
FIG. 9 is a system block diagram showing another embodiment of the present invention.

FIG. 9 is a system block diagram showing another embodiment of the present invention. The same reference numerals in FIG. 9 denote blocks common to those in the system shown in FIG. 1. The display control means shown in FIG. 1 is omitted from FIG. 9. Differences from the system shown in FIG. 1 are that a tracking data setting means 3000 is arranged, and that the system controller 900 has a function of processing tracking information. Therefore, this function can be easily added to the system shown in FIG. 1.

In this embodiment, access preparation of cassettes in the VTR can be quickly made. When the cassettes are exchanged inside the VTR, once tracking adjustment data is measured, the data read out from the cassette information storage means 915 can be used in the next operation. Therefore, tracking adjustment need not be performed every time cassettes are exchanged, and the next operation mode can be smoothly obtained.

The differences from the system shown in FIG. 1 will be described below. An operation mode setting/control means 902 can exchange data with a tracking data setting means 3000. When a plurality of cassettes are selectively subjected to a play operation, tapes recorded by other VTRs may be mixed. Since tracking characteristics of VTRs are slightly different from each other, tracking adjustment is often performed so as to obtain the best tracking characteristics according to cassette tapes. When the tracking adjustment is performed by a user through the tracking data setting means 3000, tracking adjustment data is supplied to a cassette information storage means 915, and is stored at an address of the corresponding cassette. When the corresponding cassette is selected again to perform a play operation, the corresponding tracking adjustment data is automatically read out from the cassette information storage means 915, and is supplied to the tracking data setting means 3000 through a use cassette determination/control means 901 and the operation mode setting/control means 902. As a tracking adjustment method, various methods are available. For example, a method of adjusting a delay time constant in a channel of head switching pulses is known.

Thus a table shown in, e.g., FIG. 10 is formed in the cassette information storage means 915. In FIG. 10, a "mount position" area is a data area for distinguishing a plurality of cassette mount positions provided to the tray unit of the VTR. A "presence/absence of cassette" area is an area for storing information obtained from a cassette detection means 912, and indicates the presence/absence of a cassette at the corresponding mount position. A "recording possible/impossible" area is an area for storing information obtained from a safety lug detection means 911. A "remaining amount" area is a tape remaining amount storage area, and stores information obtained from a tape remaining amount measurement means 918. Furthermore, a "tracking adjustment data" area is an area for storing tracking adjustment data obtained from the tracking setting means 3000 in correspondence with cassettes. In addition, a "selection setting" area may be provided. This area stores setting information from, e.g., a cassette selection setting means 913. When a user designates a use cassette, designation information is stored in the corresponding area.

As described above, since this system comprises the cassette information storage means 915, information in the means 915 can be looked up upon setting of an operation mode of the VTR. When cassette information is looked up, various operations can be facilitated. In particular, once counter/remaining amount data, and tracking adjustment data are set, the remaining amount measurement and tracking adjustment need not be repetitively performed when the corresponding cassette is selected, thus achieving a quick and proper exchange operation.

When the absence of a cassette is determined, data of the corresponding mount position is cleared. When a cassette convey control means 914 is exposed outside the VTR, and a change in detection signal from the cassette detection means 912 is detected, this means that a user exchanges cassettes outside the VTR. At this time, a system controller 900 controls the cassette information storage means 915 to clear cassette information of the corresponding mount position.

Some operation examples will be exemplified below.

Assume that cassettes are placed at the mount positions A to C of the mount positions A to D.

(1) When a user designates a cassette at the position A, designation information is stored in the corresponding selection setting area. Then, the use cassette determination/control means 901 controls the cassette convey control means 914 to set the designated cassette at a predetermined tape driving position, and thereafter, a standby state for waiting for an operation mode input is set. Thus, the VTR is set in a recording possible state. If the corresponding cassette has already been recorded, a play operation is also possible.

(2) Assume that a user designates a cassette at the position B, and thereafter, performs an operation for measuring the remaining amounts of all the cassettes. The use cassette determination/control means 901 sequentially conveys the cassettes excluding the cassette at the position B, whose designation information is stored, to the tape driving position so as to measure the tape remaining amounts of the conveyed cassettes, and updates corresponding tape information. Finally, the means 901 controls to measure the tape remaining amount of the cassette at the position B.

With this measurement order function, a cassette finally mounted on the tape driving section is the cassette at the position B, i.e., the selected and designated cassette. Therefore, if the recording operation is then started, a tape driving operation is immediately allowed, thus eliminating an unnecessary cassette exchange time.

When a user performs an operation for measuring the tape remaining amounts of non-measured cassettes, the table is looked up to detect cassettes whose remaining amount data are not stored. The detected cassettes are conveyed to the tape driving section, and their tape remaining amounts are measured. In this case, it is checked if cassette designation information is stored in the selection setting area. If it is determined that the designation information is stored, the corresponding cassette is mounted on the tape driving section. If no designation information is detected, the finally measured cassette is left on the driving section.

(3) The VTR has a tape end detection means 919 (FIG. 1 and FIG. 3). Detection information from this detection means is also input to the system controller 900. If a tape end detection signal is input in a recording mode, the use cassette determination/control means 901 looks up the table to detect a recordable cassette, and causes the convey control means 914 to exchange the detected cassette with the recorded cassette. In this case, a cassette to be used next is determined. Basically, the remaining cassettes are sequentially searched from the position A. Alternatively, the tape remaining amount data may be looked up to select a cassette having the largest recordable tape remaining amount. Note that the tape end may be detected based on the remaining amount measured by the tape remaining amount measurement means 918.

(4) When a user designates a cassette at the position D as a use cassette, the table may be looked up to display an alarm message indicating the absence of a cassette. Programs for realizing various conveniences for a user may be created to extend the functions.

(5) Of course, when a cassette is selected, and is mounted on the tape driving section, tracking adjustment data of the corresponding cassette is read out, and is set in the tracking setting means 3000. The tracking setting means 3000 normally stores reference data. However, when adjustment is made, data after adjustment is stored in the means 3000, as described above.

(6) After the tape remaining amount measurement, tape remaining amount data of a cassette mounted on the tape driving section is also read out, and is displayed on a display unit 920.

Figure 11:
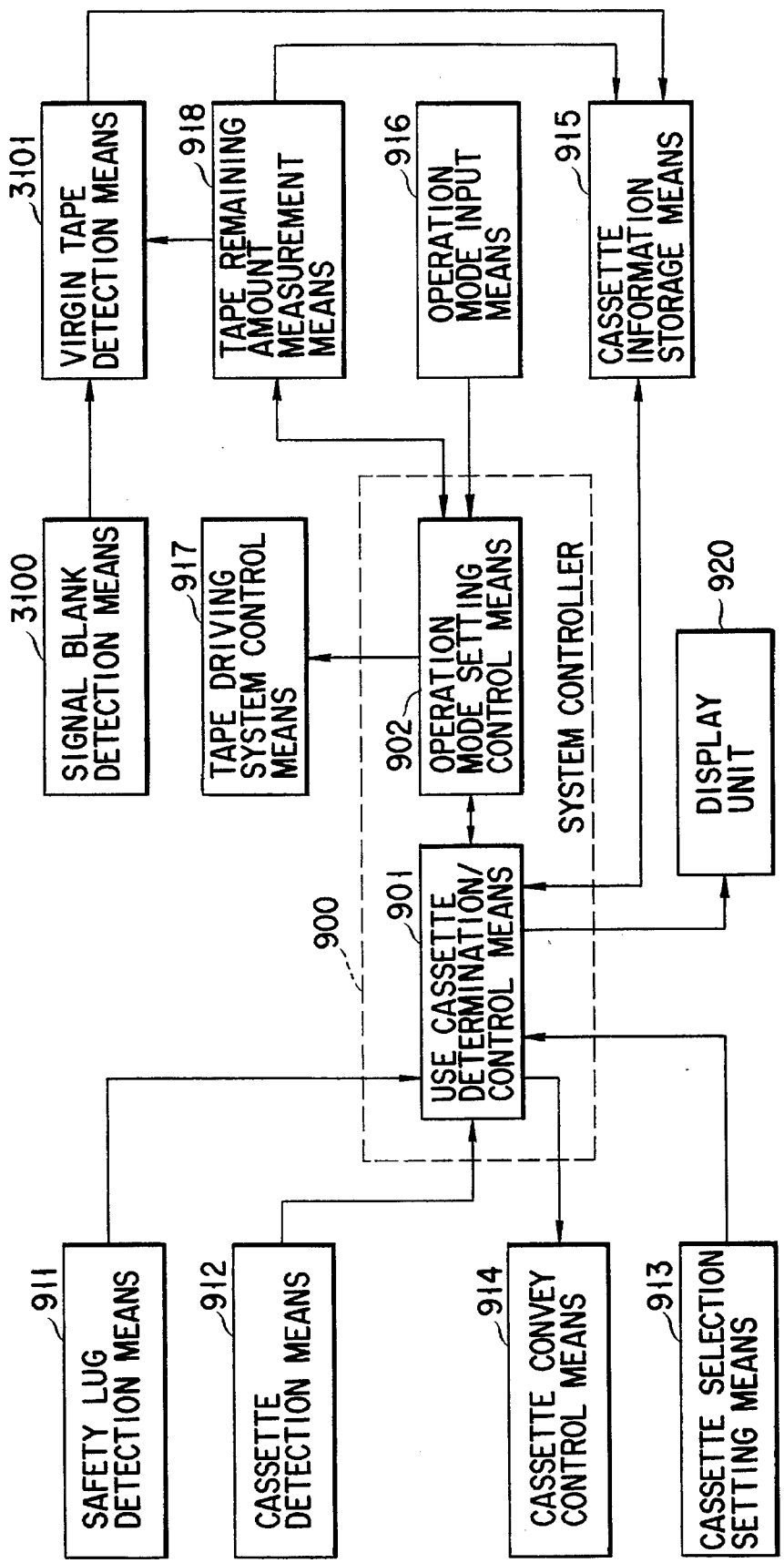
FIG. 11 is a system block diagram showing still another embodiment of the present invention.

FIG. 11 shows still another embodiment of the present invention.

The same reference numerals in FIG. 11 denote blocks common to those in the system shown in FIG. 1. The display control means shown in FIG. 1 is omitted from FIG. 11. A difference from the system shown in FIG. 1 is that a signal blank detection means 3100, and a virgin tape detection means 3101 are arranged. A system controller 900 has a function of controlling the signal blank detection means 3100 for a tape, and the virgin tape detection means 3101. Therefore, this function can be easily added to the system shown in FIG. 1.

In this embodiment, pieces of information for each cassette loaded in the VTR are further elaborated, and are stored in a cassette information storage means 915. For this reason, upon execution of various functions (e.g., a timer recording function), there are rich look-up data such as cassette selection data, cassette use order data, and the like, and a proper operation can be obtained.

The difference from the system shown in FIG. 1 will be described below.

When a tape remaining amount measurement means 918 measures the tape remaining amount, the signal blank detection means 3100 for detecting the presence/absence of a recording state of a tape is operated.

When the measurement result from the tape remaining amount measurement means 918 or the tape end detection means 919 (FIG. 1 and FIG. 3) indicates that a current tape state corresponds to the tape leading end, and the signal blank detection means 3100 detects that no signal is recorded, the virgin tape detection means 3101 determines that the tape in measurement is a virgin tape, and supplies virgin tape information to the cassette information storage means 915. This function is a virgin tape determination function. With this function, even a recorded tape may be determined as a virgin tape if the tape leading end is detected and the cassette having that tape has a safety lug.

Thus, a table shown in, e.g., FIG. 12 is formed in the cassette information storage means 915. In FIG. 12, a "mount position" area is a data area for distinguishing a plurality of cassette mount positions provided to the tray unit of the VTR. A "presence/absence of cassette" area is an area for storing information obtained from a cassette detection means 912, and indicates the presence/absence of a cassette at the corresponding mount position. A "recording possible/ impossible" area is an area for storing information obtained from a safety lug detection means 911. A "remaining amount" area corresponds to a tape remaining amount storage area, and a "virgin" area is an area for storing information indicating whether or not a corresponding cassette is a virgin tape. A "selection setting" area is an area for storing setting information from a cassette selection setting means 913. When a user designates a use cassette, designation information is stored in the corresponding area.

As described above, since this system comprises the cassette information storage means 915, it can look up this information upon setting of an operation mode of the VTR. When cassette information is looked up, various operations can be facilitated.

When the absence of a cassette is determined, data at the corresponding mount position is cleared.

Some operation examples will be explained below.

Assume that cassettes are placed at the mount positions A to C of the mount positions A to D.

The same operations as in the examples (1), (2), (4), (5), and (6) described in the embodiment shown in FIG. 9 are performed in this embodiment. As for the example (3) described in the embodiment shown in FIG. 9, a function is added like in the following example (7).

(7) The VTR has a tape end detection means 919 (FIG. 1, FIG. 3). Detection information from this detection means is also input to the system controller 900. If a tape end detection signal is input in a recording mode, a use cassette determination/control means 901 looks up the table to detect a recordable cassette, and causes a cassette convey control means 914 to exchange the detected cassette with the recorded cassette. In this case, a cassette to be used next is determined. Basically, the remaining cassettes are sequentially searched from the position A. Prior to this operation, it is checked if there is a virgin tape. If it is determined that there is a virgin tape, and this tape is recordable, the corresponding cassette is selected as a use cassette. Note that the tape end may be detected based on the remaining amount measured by the tape remaining amount measurement means 918.

Figure 13:
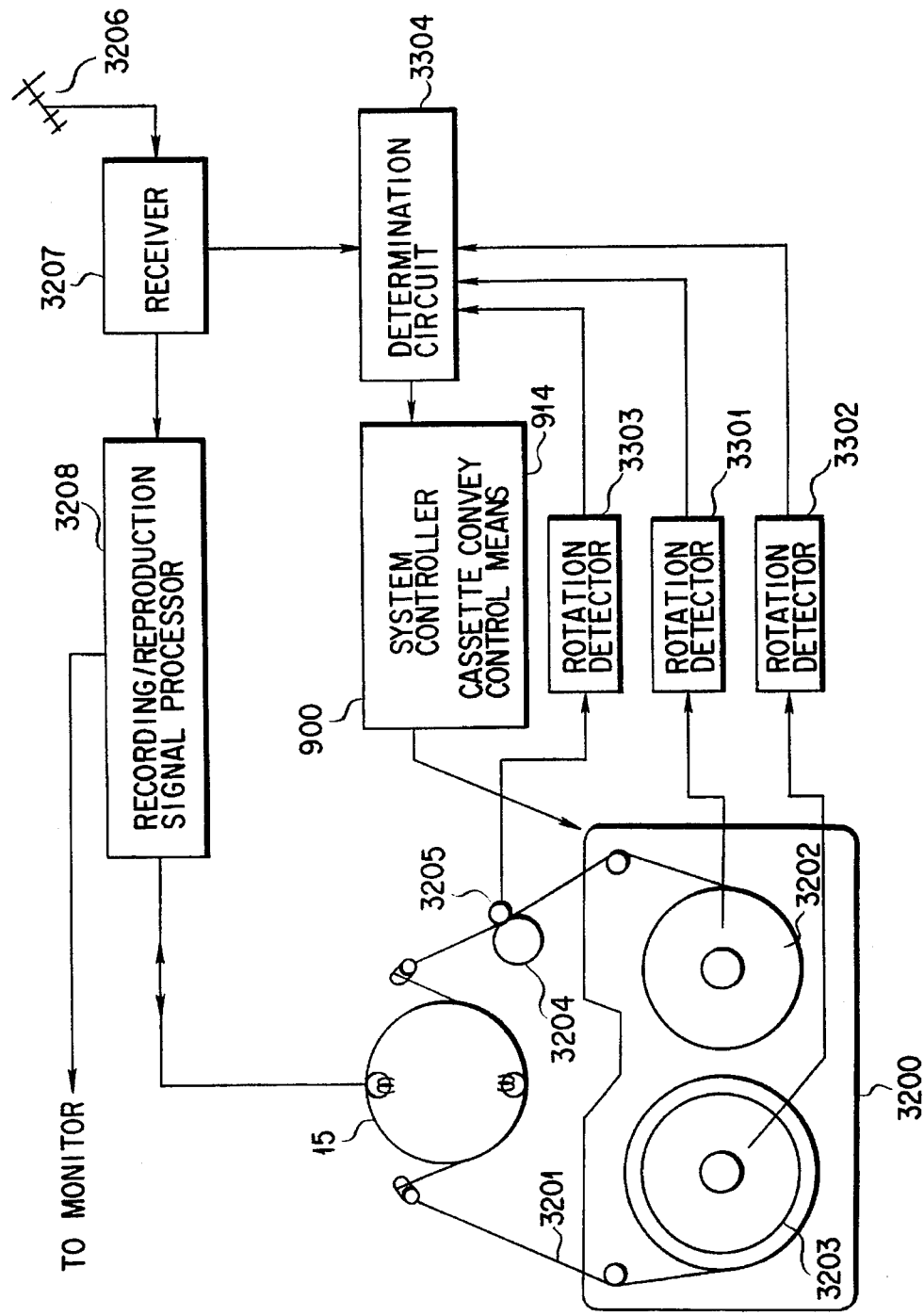
FIG. 13 is a system block diagram showing still another embodiment of the present invention.

FIG. 13 shows still another embodiment of the present invention. This embodiment exemplifies a means for obtaining a cassette exchange timing signal. In this embodiment, when a cassette exchange timing is reached during a recording operation, a recorded cassette can be automatically exchanged with another cassette during a period of a commercial signal. Therefore, the cassette exchange timing corresponds to an input period of the commercial signal, and broadcast programs can be recorded over a plurality of cassettes to have continuous contents.

A tape driving section 3200 performs a tape loading operation of a cassette mounted thereon, so that a tape 3201 is in rolling contact with a rotary head drum 15.

The tape driving section 3200 detects the rotations of a supply reel base 3203 and a take-up reel base 3202, and detection pulses are respectively input to rotation detectors 3302 and 3301. The tape 3201 travels while being sandwiched between a pinch roller 3204 and a capstan shaft 3205. In this case, rotation detection pulses of a capstan motor are also input to a rotation detector 3303. The wave-shaped rotation detection pulses output from the rotation detectors 3301, 3302, and 3303 are input to a determination circuit 3304. The determination circuit 3304 is partially included in the system controller, and is controlled by a program. The rotation detectors 3301–3303 and the determination circuit 3304 construct the tape remaining amount measurement means 918 shown FIG. 1 and so on. The determination circuit 3304 can calculate a tape remaining amount using the rotation detection pulses, and normally supplies the calculated tape remaining amount to a display (not shown).

On the other hand, reference numeral 3206 denotes an antenna. A high-frequency signal is supplied to a receiver 3207, and is subjected to channel selection. A received video signal is converted into a recording signal by a recording/reproduction signal processor 3208, and is supplied to a video head of a rotary head drum 15. The recording signal is also supplied to a monitor (not shown). In a play mode, a signal reproduced from the video head is input to the recording/reproduction signal processor 3208, and is converted into a reproduction video signal. The video signal is input to the monitor.

The receiver 3207 includes a multiplex audio signal processor. As is well known, the multiplex audio signal processor discriminates a bilingual, monaural, or stereo broadcast mode, and switches the operation mode of an audio processor to match with a received broadcast signal. Therefore, in the stereo broadcast mode, an identification signal of this mode is obtained.

This system effectively utilizes the identification signal. The identification signal is also input to the determination circuit 3304. This system utilizes the fact that an audio signal is sent in a stereo mode in a commercial broadcast state. In general, commercial programs are periodically broadcast in each program. When a stereo broadcast program is detected in a bilingual or monaural broadcast state, the determination circuit 3304 determines that it is a commercial broadcast program.

The determination circuit 3304 checks if the tape remaining amount is equal to or smaller than a predetermined amount. The circuit 3304 has a function of interrupting a recording mode, and controlling the system controller 900 and the cassette convey control means 914 to exchange a cassette on the tape driving section 3200 when it is determined that the tape remaining amount is equal to or smaller than the predetermined amount, and commercial broadcast is detected. Thus, a program to be recorded on a series of a plurality of cassettes can be continuous among the cassettes since the cassettes are exchanged during commercial periods.

FIG. 14 is a block diagram showing a commercial cycle determination function in the determination circuit 3304. A stereo mode signal from the receiver 3207 is input to a stereo signal detector 3401. A stereo detection signal output from the stereo signal detector 3401 is input to a timer circuit 3402, and is also supplied to a differential circuit 3403 as a timing signal. The timer circuit 3402 is reset every time the stereo detection signal is input, and counts clocks. The differential circuit 3403 calculates the difference between a count value obtained from the timer circuit 3402, and the immediately preceding count value, and forms input cycle data of the stereo signals. The cycle data output from the differential circuit 3403 is input to a cycle determination circuit 3404. The cycle determination circuit 3404 which is set at a cycle setting circuit 3407 has a plurality of cycle data, and determines cycle data closest to the data from the differential circuit 3403, thereby outputting distribution data of cycle data. A distribution data forming circuit 3405 forms a distribution of cycle data, which are obtained a plurality of times, and then forms statistical distribution data indicating T1, T2, T3, or T4 corresponding to the cycle. The distribution data from the distribution data forming circuit 3405 is input to a maximum probability determination circuit 3406. The maximum probability determination circuit 3406 detects a cycle having the largest value, and determines that a stereo broadcast signal input at this cycle is a commercial signal, thus outputting a timing signal. When this timing signal is obtained, and the tape remaining amount is equal to or smaller than the predetermined amount, the determination circuit 3304 starts a cassette exchange operation.

Figure 15A:
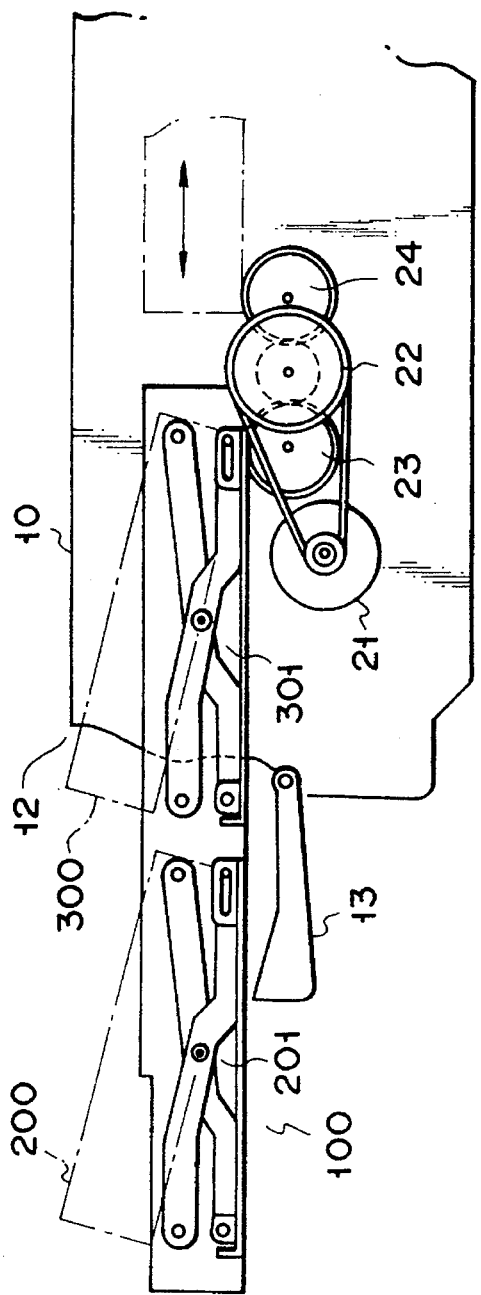
FIGS. 15A, 15B, and 15C are respectively sectional views showing the basic arrangement in first, second, and third operation modes of a cassette loading mechanism of a VTR, which adopts the present invention.
Figure 15B:
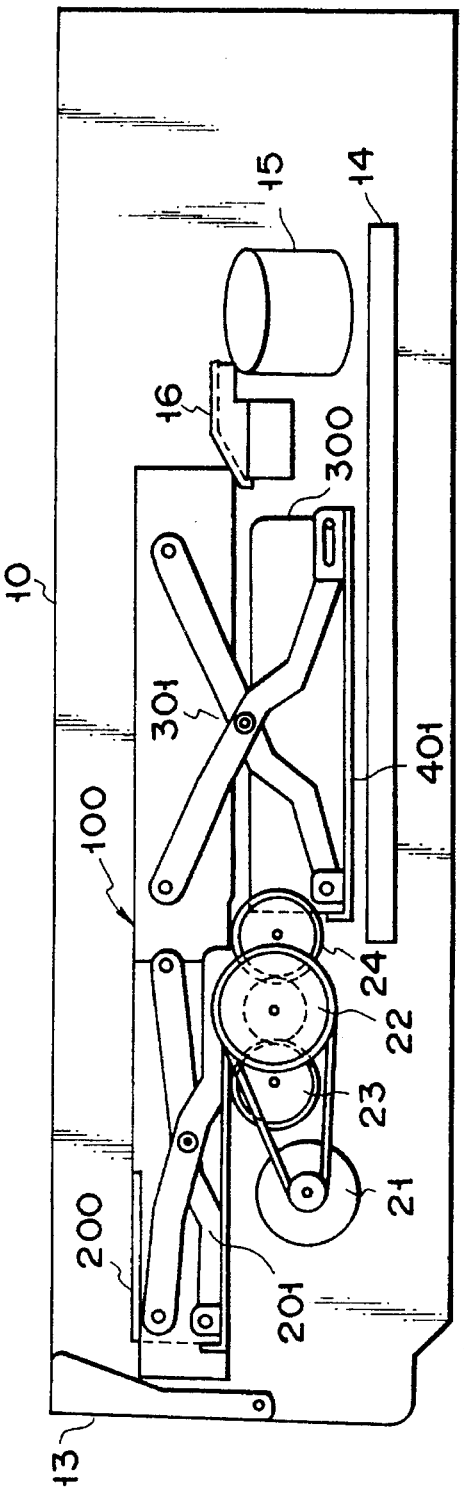
Figure 15C:
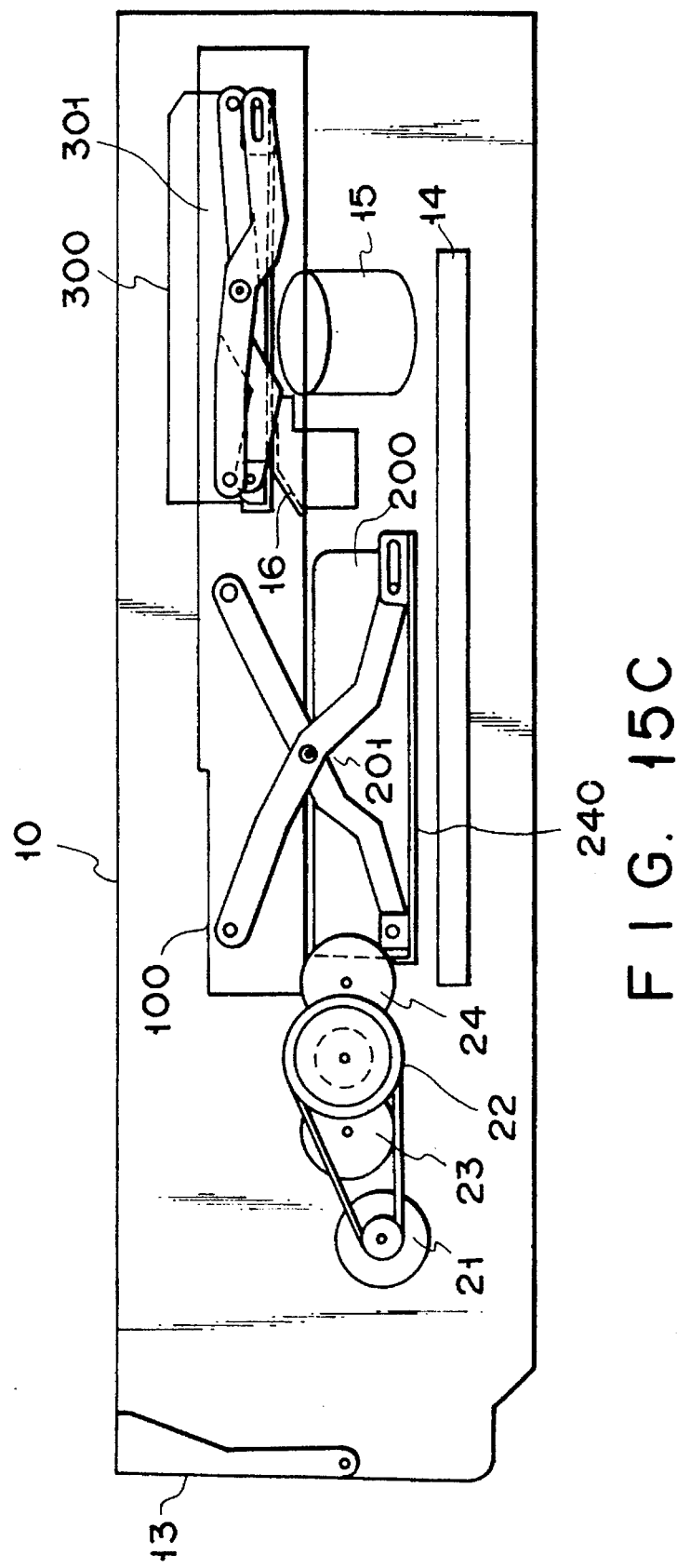

FIGS. 15A, 15B, and 15C are explanatory views showing the basic structure of a cassette loading/unloading mechanism of a VTR, which adopts the present invention. Reference numeral 10 denotes a VTR housing. An opening 12 is formed in the front surface of the VTR housing 10. A tray unit 100 can be horizontally inserted or exposed from the interior of the housing 10 through the opening 12. Note that reference numeral 13 denotes a lid provided to the opening 12. The lid 13 is opened when the tray unit 100 is drawn from the housing 10, and is closed when it is inserted in the housing 10. Although not shown, the opening/closing operation is realized by a lid opening/closing mechanism interlocked with the tray unit 100.

In the housing 10, a motor 21 is arranged at a stationary position as a tray driving mechanism, and can rotate an intermediate gear 22. The intermediate gear 22 has a rotating shaft extending in a direction perpendicular to the back-and-forward moving direction of the tray unit 100, and can rotate driving gears 23 and 24 respectively rotatably provided to the front and rear sides of the gear 22. The driving gears 23 and 24 are meshed with a rack provided to the lower surface of the side portion of the tray unit 100, and can drive the tray unit 100 in the back-and-forth direction. The VTR includes a function of mounting a cassette at a predetermined position, and executing a tape loading operation. Reference numeral 14 denotes a main chassis, which is provided with reel shafts each engaging with a reel hub of a cassette, and various parts (not shown) necessary for the tape loading and tape driving operations. Reference numeral 15 denotes a rotary head drum, which is in rolling contact with a tape drawn from a cassette mounted at a predetermined mount position by the tape loading operation. FIG. 15A shows a state wherein the front driving gear 23 is meshed with the rack. FIG. 15B shows a state wherein both the front and rear driving gears 23 and 24 are meshed with the rack. FIG. 15C shows a state wherein the rear driving gear 24 is meshed with the rack.

The tray unit 100 has a tray frame having a frame shape when viewed from the upper surface. Rails outside the side plates of the tray frame are horizontally movably guided by rollers arranged on the inner side surfaces of the housing 10.

In this system, two cassettes, i.e., cassettes 200 and 300 can be respectively arranged on the front and rear regions of the upper surface of the tray unit 100 (FIG. 15A). Pantograph mechanisms 201 and 301 are respectively attached to the front and rear regions of the tray unit 100. The pantograph mechanisms 201 and 301 have the same mechanism, and can move cassette bottom support plates upward or downward by a link mechanism.

FIG. 15A shows a state wherein the cassettes 200 and 300 are respectively placed on the front and rear regions. The reason why the front end portions of the cassettes 200 and 300 are directed obliquely upward is that these cassettes are popped up by a pop-up mechanism provided to the tray unit 100 to facilitate a loading/unloading operation of the cassettes. In addition, the tray unit 100 is designed, so that, in this state, the rear cassette 300 can be removed without largely drawing the tray unit 100 from the opening of the housing 10. More specifically, the front cassette 200 is entirely exposed, while only a portion (front end portion) of the rear cassette 300 is exposed from the opening. With this design, a distance required for drawing the tray unit 100 can be shortened, and the space factor in a surrounding area can be reduced in terms of handling.

FIG. 15B shows a state wherein the rear pantograph mechanism 301 mounts the cassette 300 to a cassette mount position below a tray passage position. FIG. 15C shows a state wherein the front pantograph mechanism 201 moves the cassette 200 downward, and mounts it at a predetermined cassette mount position. When the state shown in FIG. 15A is shifted to the state shown in FIG. 15B, the tray driving mechanism is operated to horizontally move the tray unit 100 toward the interior of the housing 10, and the tray unit 100 is stopped when it reaches a first detection position (rear cassette driving position). When the tray unit reaches this position, a pantograph driving mechanism (to be described later) is enabled to drive the pantograph mechanism 301, thereby moving the cassette 300 downward. When the state shown in FIG. 15B is shifted to the state shown in FIG. 15C, the pantograph driving mechanism drives the pantograph mechanism to lift up the cassette 300 at its downward position, thereby returning the cassette 300 to an original position on the tray unit 100. The tray driving mechanism moves the tray unit 100 to a deeper position, and the movement of the tray unit 100 is stopped when the pantograph mechanism 201 reaches a position above a cassette mount position, i.e., a second detection position (front cassette driving position). The pantograph driving mechanism drives the pantograph mechanism 201 in turn, thereby moving the cassette 200 downward to a predetermined position.

In the state shown in FIG. 15C, the pantograph mechanism 301 carrying the rear cassette 300 is located immediately above the rotary head drum 15. In this state, the pantograph mechanism 301 is guided in a direction to slightly float from the tray unit 100, so that the cassette 300 and the pantograph mechanism 301 do not collide against the rotary head drum 15. A member for lifting up the pantograph mechanism 301 is a guide member 16 projecting from the inner side surface of the housing 10. More specifically, when the tray unit 100 is moved from the state shown in FIG. 15A to a deeper position while the cassette 300 is located at its upward position, the bottom plate of the pantograph mechanism 301 rides on the inclined surface of the guide member 16. In this manner, the reason why the cassette 300, i.e., the pantograph mechanism is slightly lifted up at the standby position of the cassette 300 is that if the height of the housing 10 is decreased to realize a compact structure, the moving path of the tray unit 100 collides against the upper portion of the rotary head drum 15. In addition, this structure is adopted to suppress a temperature rise by attaining sufficient ventilation around the rotary head drum 15, and in consideration of safety of a cassette tape.

Since the gears 23 and 24 are arranged in this manner, the total length of the tray unit 100 in the back-and-forth direction can be shortened. If the driving gears of the tray unit 100 are realized by one gear, the total length of the tray unit 100 becomes undesirably larger than that of this embodiment. This is because one gear must be meshed with the rack in both the states shown in FIGS. 15A and 15C. Since the total length of the tray unit 100 can be shortened, the weight can be decreased to reduce a load on a driving device, and a projecting space of the tray unit 100 upon loading of cassettes can be narrowed. Thus, space factor can be reduced in a surrounding area. In other words, even when the tray unit 100 has a small total length, the moving stroke of the tray unit 100 can be increased.

Figure 16A:
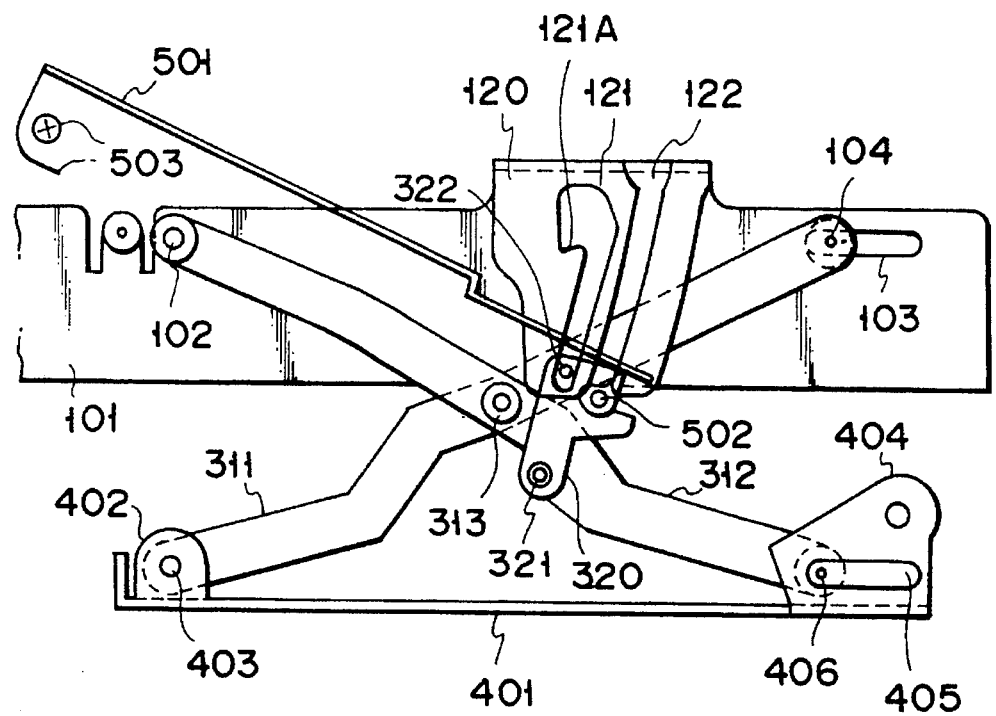
FIGS. 16A and 16B are respectively sectional views showing the arrangement for explaining a pantograph mechanism and its driving mechanism of a VTR, which adopts the present invention.
Figure 16B:
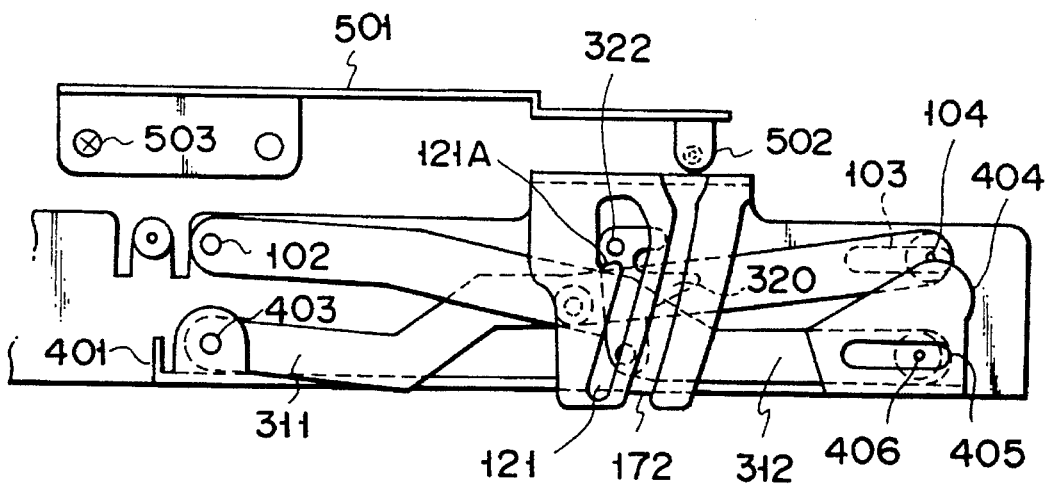

FIGS. 16A and 16B show the pantograph mechanism 301, and also show the pantograph driving mechanism.

Various embodiments of the pantograph mechanism 301 are available. However, the pantograph mechanism of this apparatus adopts a basic arrangement in which first and second link levers 311 and 312 cross each other in an X shape when viewed from the side surface. The crossing portions of the link levers 311 and 312 are coupled through a shaft 313. Thus, the link levers 311 and 312 can be set in a state wherein the two ends thereof approach each other (upward movement state), or in a state wherein the two ends are separated from each other (downward movement state), as shown in FIGS. 16B and 16A. The front end portions of the link levers 312 and 311 are respectively pivotally mounted on a frame 101 of the tray unit 100, and a mounting portion 402 of a cassette bottom support plate 401 through shafts 102 and 403. The rear end portion of the link lever 311 is engaged with an elongated hole 103 formed in the frame 101 through a pin 104. The rear end portion of the link lever 312 is engaged with an elongated hole 405 formed in a mounting portion 404 of the cassette bottom support plate 401 through a pin 406. Thus, the link mechanism can move the cassette bottom support plate 401 to the upward or downward position.

The pantograph mechanism for driving the pantograph mechanism 301 will be described below.

The pantograph driving mechanism has a pivotal member 501 for pushing down or pulling up an intermediate cam 320, which is pivotally attached to the link lever 312. The intermediate cam 320 is pivotally mounted on the middle portion of the link lever 312 through a shaft 321, and moves upward and downward to follow the movement of the link lever 312. In this case, an engagement pin 322 is provided to the intermediate cam 320. This engagement pin 322 is engaged with a hole 121 of a guide plate 120 attached to the frame 101 at a predetermined interval therebetween. This hole 121 is a groove-like hole, and has a locking function for locking the upward position of the pantograph mechanism, and a regulating function for regulating the upward/downward movement path and the downward position of the pantograph mechanism. That is, since the engagement pin 322 of the intermediate cam 320 moves along the hole 121, the upward/downward movement path is regulated, and the downward position is determined by the lower end portion of the hole 121. Upon the upward movement, the engagement pin 322 is engaged with a locking portion 121A formed as a stepped recess in the hole 121, thereby preventing an unexpected downward movement of the pantograph mechanism.

A guide groove 122 is also formed in the guide plate 120 to be parallel to the hole 121. This guide groove 122 is so formed as to notch the guide plate 120 at its upper and lower end portions. The pivotal distal end of the intermediate cam 320 is located to overlap and cross the guide groove 122. Since the guide groove 122 is cut away in the vertical direction, a roller 502 provided at the distal end of the pivotal member 501 can pass through this groove 122. The roller 502 faces the guide groove 122 from the above on the drawing surface.

The pivotal member 501 is pivotally mounted through a shaft 503 at a fixed position (above the path through which the tray unit 100 passes) inside the housing, and its pivotal distal end portion can be moved upward and downward along the guide groove 122. FIG. 16B shows a state before the pantograph driving mechanism operates. In this state, the roller 502 is located above the entrance of the guide groove 122. When a position detection means of the tray unit 100 generates position detection information, the pivotal member 501 is driven to pivot about the shaft 503 by a driving means (not shown). In this state, the roller 502 enters the guide groove 122. When the roller 502 abuts against the pivotal end portion of the intermediate cam 320, the intermediate cam 320 is slightly pivoted clockwise. For this reason, the engagement pin 322 of the intermediate cam 320 is disengaged from the locking portion 121A to be movable downward along the hole 121. Therefore, the pivotal member 501 is continuously pivoted to the state shown in FIG. 16A. With this pivotal motion, the cassette bottom support plate 401 supported by the pantograph mechanism is moved downward to mount a cassette at a predetermined mount position. At this time, the position of the engagement pin 322 of the intermediate cam 320 is regulated by the hole 121, and this consequently determines the position of the cassette. In addition, an elastic pressing member, which is rotated with the shaft 503 of the pivotal member 501, presses the central portion of the cassette in the right-and-left direction from the above.

FIG. 16A shows a state wherein the cassette bottom support plate 401 is at its downward position. In order to move the cassette bottom support plate 401 from the downward position to the upward position, the pivotal member 501 is pivoted counterclockwise by the driving means (not shown). Since the roller 502 is engaged with the U-shaped recess of the intermediate cam 320, it pulls up the intermediate cam 320. With this movement, the link mechanism is operated to move the cassette bottom support plate 401 upward. Immediately before the intermediate cam 320 is set in the state shown in FIG. 16B, the roller 502 pushes the intermediate cam 320 counterclockwise. As a result, the engagement pin 322 of the intermediate cam 320 is moved to the locking portion 121A. Therefore, when the cassette bottom support plate 401 is moved upward, and located at the same level as the tray unit 100, the link mechanism is not accidentally operated in a direction to move downward.

FIGS. 16A and 16B exemplify the left pantograph mechanism and its driving mechanism when viewed from the opening. However, the same mechanism is provided at the right side of the opening, and the right and left mechanisms are synchronously operated.

Figure 17:
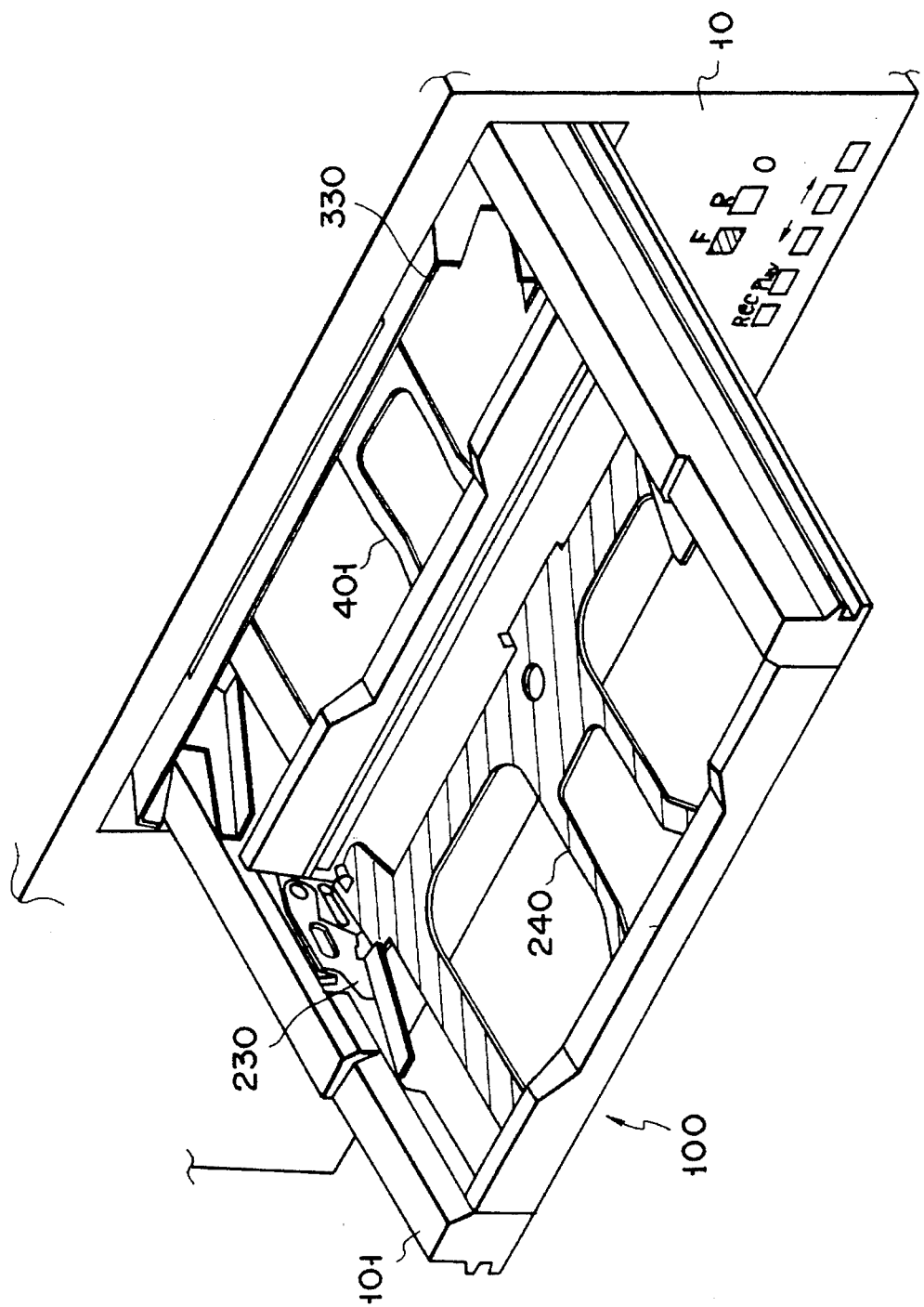
FIG. 17 is a perspective view showing an extraction state of a tray unit of the VTR.

FIG. 17 is a schematic perspective view showing a state wherein the tray unit 100 is fully drawn from the housing 10. As can be seen from FIG. 17, the front pivotal ends of pop-up members 230 and 330 are directed upward with respect to horizontal cassette bottom support plates 240 and 401.

Operation switches such as recording (Rec), play (Play), rewind, fast forward, stop switches, and the like are arranged on an operation unit of the VTR main body, and switches for designating front and rear cassette loading modes F and R are also arranged.

This system includes a safety lug detecting unit for detecting whether or not the safety lug of a cassette mounted on the tray unit 100 is removed.

FIGS. 18A and 18B show a left rear corner of the frame 101 in detail. FIG. 18A is a perspective view, and FIG. 18B is a rear view. A notch 130 notched in an L shape is formed in the lower portion of the corner portion of the frame 101. An L-shaped lug detection lever 701 is arranged along the notch 130. The intermediate portion of the lug detection lever 701 is mounted on the thick surface of the frame through a shaft 702, and the lever 701 is pivotal about the shaft 702. The lever 701 is normally biased by a spring (not shown), so that a projection 703 at one end portion of the lever 701 projects inwardly from the frame. A downward projection 704 is formed at the other end portion of the lug detection lever 701. A groove 131 formed on the outer side surface of the frame 101 receives a roller fixed to the inner surface of the housing. The frame is movably guided by this roller in the back-and-forth direction.

FIGS. 19A and 19B show states wherein cassettes 200A and 200B are respectively mounted on the tray unit 100. In the case of the cassette 200A, the safety lug is removed, and in the case of the cassette 200B, the safety lug remains. As can be seen from the comparison between FIGS. 19A and 19B, the pivot angle of the lug detection lever 701 is varied depending on whether the lug is present. On the other hand, when the tray unit 100 is inserted in the housing, the lug detection lever 701 is moved together with the frame 101. A shutter mechanism 720 is arranged below the moving path of the lever 701 (FIG. 19C). In the shutter mechanism 720, a pivotal driving lever 722 is attached to a shaft 721 at a stationary position, and a projection 723, which can contact the projection 704 of the lug detection lever 703, is formed on one end of the driving lever 722. The projections 723 and 704 can contact each other only when the lug detection lever 701 is in the state shown in FIG. 19B (when the safety lug remains). When the lever 701 is in the state shown in FIG. 19A, these projections cannot contact each other. When the projection 704 approaches and is brought into contact with the projection 723, the driving lever 722 is pivoted in a direction of an arrow in FIG. 19C about the shaft 721. When a non-contact state is attained after the projection 723 passes the projection 704, the lever 722 is returned to its original position. In this operation, the driving lever 722 drives a shutter plate 725 through an intermediate lever 724, and temporarily shields light incident on a tape end detection element 730. The shutter plate 725 is pivotally supported on a shaft 726 at a stationary position, and its pivotal end portion is coupled to the intermediate lever 724.

As described above, according to this safety lug detecting unit, when a cassette is mounted on the tray unit, and the tray unit is inserted in the housing, the presence/absence of the lug of the cassette can be determined based on the presence/absence of an output from the tape end detection element 730. The tape end detection element 730 is used in tape end detection, and with this device, multi-functions can be realized.

In FIGS. 18A to 19C, the lug detection lever 701 is provided to the front region of the frame 101. The same lug detection lever is also provided to the rear region, so that the safety lug of a cassette mounted on the rear region can be detected. Since the front and rear lug detection levers are designed to pass the arranging position of the driving lever 722, the function of the tape end detecting unit is commonly used. Therefore, when two cassettes are recordable, a detection signal is obtained twice.

The above arrangement exemplifies a safety lug detecting unit. The same device is symmetrically arranged at the right side of the frame, and a cassette detection lever, a shutter mechanism, and a photosensor are arranged, thus obtaining a cassette detecting unit.

Figure 20:
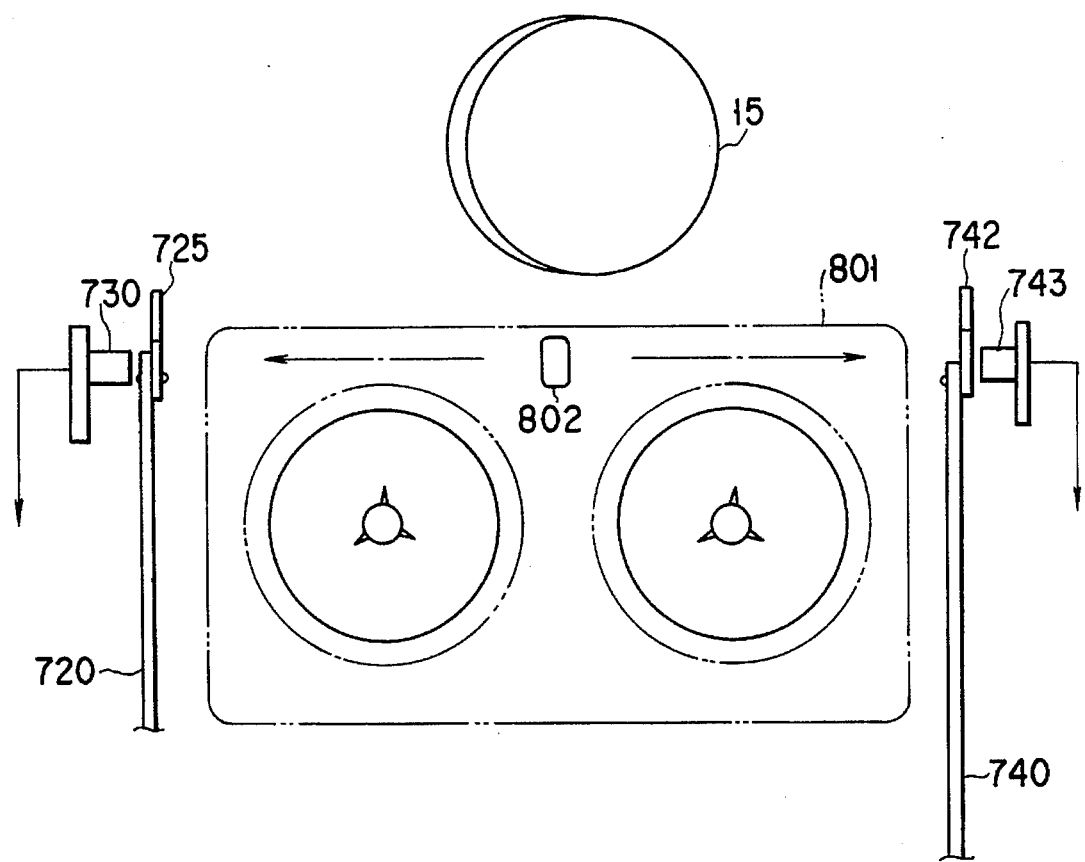
FIG. 20 is an explanatory view showing the arrangement positions of the safety lug detecting unit, and a sensor unit of a cassette detecting unit.

FIG. 20 shows the position of the tape end detecting unit, and a sensor for obtaining a detection signal. Reference numeral 801 denotes a predetermined mount position in the vicinity of the rotary head drum 15. At this position, a cassette is mounted by the pantograph mechanism. In this mount state, a tape driving operation is enabled. When the cassette is mounted, a light source unit 802 constituting the tape end detecting unit enters a hole formed at the center of the bottom surface of the cassette in the right-and-left direction. Light emitted from the light source unit 802 is horizontally radiated in the right-and-left direction. At the left side, the tape end detection element 730 using a light-receiving element is arranged in an optical path, and at the right side, a second tape leading end detection element 743 is arranged. The shutter plate 725 and a shutter plate 742 of the shutter mechanism 720 are arranged in front of the two detection elements. The outputs from the detection elements are input to the system controller.

What is claimed is:

1. A use management apparatus for a plurality of cassettes, comprising:

cassette information storage means for storing presence/absence information corresponding to each of a plurality of cassettes which are located at a plurality of carrying positions, and presence/absence information corresponding to safety lugs of said cassettes, said information stored in said cassette information storing means being used as input information;

use cassette determination/control means for determining a use cassette from said plurality of cassettes based on said input information;

cassette convey control means for conveying and mounting said use cassette on a tape driving section;

time reservation information storage means for storing a set of designation information, operation information and timer information, said timing information including timer start times for each timing operation;

timer measurement means for measuring and inputting a current time;

means for comparing said timing information with said current time to determine an amount of time remaining before a next timing operation, and for comparing said determined amount of time remaining with an amount of time necessary to measure a tape remaining amount on one of said cassettes; and tape remaining amount measurement means for measuring a tape remaining amount on one of said plurality of cassettes and for storing said measured tape remaining amount in said cassette information storage means, said tape remaining amount being measured only when said determined amount of time remaining is greater than said amount of time necessary to measure said tape remaining amount on one of said cassettes, wherein said determination of measured tape amounts is used by said use cassette determination/control means for determining which cassettes are selected as use cassettes.

* * * * *